United States Patent
Freda et al.

(10) Patent No.: US 12,160,892 B2
(45) Date of Patent: Dec. 3, 2024

(54) RADIO (NR) VEHICLE TO VEHICLE (V2X)—METHODS FOR SCHEDULING SIDELINK IN UNLICENSED SPECTRUM

(71) Applicant: INTERDIGITAL PATENT HOLDINGS, INC., Wilmington, DE (US)

(72) Inventors: Martino Freda, Laval (CA); Patrick Tooher, Montreal (CA); Faris Alfarhan, Montreal (CA); Tao Deng, New York, NY (US); Tuong Hoang, Montreal (CA); Moon Il Lee, Melville, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/640,110

(22) Filed: Apr. 19, 2024

(65) Prior Publication Data
US 2024/0276549 A1    Aug. 15, 2024

Related U.S. Application Data

(63) Continuation of application No. PCT/US2022/047133, filed on Oct. 19, 2022.
(Continued)

(51) Int. Cl.
*H04W 74/0816* (2024.01)
*H04L 1/1812* (2023.01)
(Continued)

(52) U.S. Cl.
CPC ....... *H04W 74/0816* (2013.01); *H04L 1/1812* (2013.01); *H04W 72/25* (2023.01); *H04W 74/0875* (2013.01)

(58) Field of Classification Search
CPC .......................... H04W 74/0816; H04W 92/18
(Continued)

(56) References Cited

U.S. PATENT DOCUMENTS

| 7,969,914 B1 | 6/2011 | Gerber et al. |
| 2021/0092783 A1 | 3/2021 | Sun et al. |

(Continued)

FOREIGN PATENT DOCUMENTS

WO    2022/147310    7/2022

OTHER PUBLICATIONS

Interdigital, Inc., "SL channel access in unlicensed spectrum," 3GPP TSG RAN WG1 #109-e, R1-2203645, e-Meeting (May 9-20, 2022).
(Continued)

*Primary Examiner* — Kiet M Doan
(74) *Attorney, Agent, or Firm* — Volpe Koenig

(57) ABSTRACT

Methods and apparatuses for scheduling sidelink communications in unlicensed spectrum are disclosed. A method performed by a first wireless transmit/receive unit (WTRU) may comprise: obtaining a grant for transmission on a sidelink (SL); receiving, from a second WTRU or an additional WTRU, a transmission that includes first channel occupancy time (COT) information; on a condition that the grant is for transmission on the SL during a COT associated with the second WTRU or an additional WTRU, determining, from a transmission received from the second WTRU, the additional WTRU, or both the second and the additional WTRU, cast information; performing a listen before talk (LBT) procedure using a set of parameters associated with information received from the second WTRU or additional WTRU; and on a condition that the LBT procedure is successful, transmitting, based on the determined cast information, data that includes second COT information.

14 Claims, 6 Drawing Sheets

Related U.S. Application Data

(60) Provisional application No. 63/353,939, filed on Jun. 21, 2022, provisional application No. 63/326,401, filed on Apr. 1, 2022, provisional application No. 63/257,381, filed on Oct. 19, 2021.

(51) Int. Cl.
*H04W 72/25* (2023.01)
*H04W 74/08* (2009.01)

(58) Field of Classification Search
USPC .......................................................... 370/329
See application file for complete search history.

(56) References Cited

U.S. PATENT DOCUMENTS

| | | | |
|---|---|---|---|
| 2021/0195637 A1 | 6/2021 | Xue et al. | |
| 2021/0400704 A1* | 12/2021 | Xue ....................... | H04L 1/1854 |
| 2023/0077297 A1* | 3/2023 | Fu ........................... | H04W 4/40 |
| 2023/0189304 A1* | 6/2023 | Zhang ................... | H04W 72/50 |
| | | | 370/329 |

OTHER PUBLICATIONS

Interdigital, Inc., "SL U physical layer design framework," 3GPP TSG RAN WG1 #109-e, R1-2203646, e-Meeting (May 9-20, 2022).
Moderator (Huawei), "FL summary#5 for AI 9.4.1.2 SL-U physical channel design framework," 3GPP TSG-RAN WG1 Meeting #110bis-e, R1-2210256, e-Meeting (Oct. 10-19, 2022).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Services and System Aspects; Enhancement of 3GPP support for V2X scenarios; Stage 1 (Release 17)," 3GPP TS 22.186 V17.0.0 (Mar. 2022).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Proximity-based services (ProSe); Stage 2 (Release 16)," 3GPP TS 23.303 V16.0.0 (Jul. 2020).
Third Generation Partnership Project, "Technical Specification Group Services and System Aspects; Proximity-based services (ProSe); Stage 2 (Release 17)," 3GPP TS 23.303 V17.0.0 (Dec. 2021).
Third Generation Partnership Project, "Technical Specification Group Services and System Aspects; Study on architecture enhancements for EPS and 5G System to support advanced V2X services (Release 16)," 3GPP TR 23.786 V0.8.0 (Aug. 2018).
Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 16)," 3GPP TS 36.213 V16.7.0 (Sep. 2022).
Third Generation Partnership Project, "Technical Specification Group Radio Access Network; Evolved Universal Terrestrial Radio Access (E-UTRA); Physical layer procedures (Release 16)," 3GPP TS 36.213 V16.9.0 (Sep. 2022).
Third Generation Partnership Project, "Technical Specification Group Radio Access Network; Evolved Universal Terrestrial Radio Access (E-UTRA); Physical layer procedures (Release 17)," 3GPP TS 36.213 V17.3.0 (Sep. 2022).
Third Generation Partnership Project, "Technical Specification Group Radio Access Network; Physical layer procedures for shared spectrum channel access (Release 16)," 3GPP TS 37.213 V16.6.0 (Jun. 2021).
Third Generation Partnership Project, "Technical Specification Group Radio Access Network; Physical layer procedures for shared spectrum channel access (Release 16)," 3GPP TS 37.213 V16.10.0 (Sep. 2022).
Third Generation Partnership Project, "Technical Specification Group Radio Access Network; Physical layer procedures for shared spectrum channel access (Release 17)," 3GPP TS 37.213 V17.3.0 (Sep. 2022).
Third Generation Partnership Project, "Technical Specification Group Radio Access Network; NR; NR and NG-RAN Overall Description; Stage 2 (Release 16)," 3GPP TS 38.300 V16.10.0 (Sep. 2022).
Third Generation Partnership Project, "Technical Specification Group Radio Access Network; NR; NR and NG-RAN Overall Description; Stage 2 (Release 16)," 3GPP TS 38.300 V16.7.0 (Sep. 2021).
Third Generation Partnership Project, "Technical Specification Group Radio Access Network; NR; NR and NG-RAN Overall Description; Stage 2 (Release 17)," 3GPP TS 38.300 V17.2.0 (Sep. 2022).
Third Generation Partnership Project, "Technical Specification Group Radio Access Network; NR; Medium Access Control (MAC) protocol specification (Release 16)," 3GPP TS 38.321 V16.6.0 (Sep. 2021).
Third Generation Partnership Project, "Technical Specification Group Radio Access Network; NR; Medium Access Control (MAC) protocol specification (Release 16)," 3GPP TS 38.321 V16.10.0 (Sep. 2021).
Third Generation Partnership Project, "Technical Specification Group Radio Access Network; NR; Medium Access Control (MAC) protocol specification (Release 17)," 3GPP TS 38.321 V17.2.0 (Sep. 2022).
Third Generation Partnership Project, "Technical Specification Group Radio Access Network; NR; Physical layer procedures for control (Release 16)," 3GPP TS 38.213 V16.7.0 (Sep. 2021).
Third Generation Partnership Project, "Technical Specification Group Radio Access Network; NR; Physical layer procedures for control (Release 17)," 3GPP TS 38.213 V17.3.0 (Sep. 2022).
Third Generation Partnership Project, "Technical Specification Group Radio Access Network; NR; Physical layer procedures for control (Release 16)," 3GPP TS 38.213 V16.11.0 (Sep. 2022).
Third Generation Partnership Project, "Technical Specification Group Radio Access Network; NR; Radio Resource Control (RRC) protocol specification (Release 16)," 3GPP TS 38.331 V16.6.0 (Sep. 2021).
Third Generation Partnership Project, "Technical Specification Group Radio Access Network; NR; Radio Resource Control (RRC) protocol specification (Release 16)," 3GPP TS 38.331 V16.10.0 (Sep. 2022).
Third Generation Partnership Project, "Technical Specification Group Radio Access Network; NR; Radio Resource Control (RRC) protocol specification (Release 17)," 3GPP TS 38.331 V17.2.0 (Sep. 2022).
Third Generation Partnership Project, "Technical Specification Group Radio Access Network; NR; Multiplexing and channel coding (Release 16)," 3GPP TS 38.212 V16.7.0 (Sep. 2021).
Third Generation Partnership Project, "Technical Specification Group Radio Access Network; NR; Multiplexing and channel coding (Release 16)," 3GPP TS 38.212 V16.10.0 (Sep. 2022).
Third Generation Partnership Project, "Technical Specification Group Radio Access Network; NR; Multiplexing and channel coding (Release 17)," 3GPP TS 38.212 V17.3.0 (Sep. 2022).

(56) References Cited

OTHER PUBLICATIONS

Third Generation Partnership Project, "Technical Specification Group Radio Access Network; NR; Physical layer procedures for data (Release 16)," 3GPP TS 38.214 V16.7.0 (Sep. 2021).
Third Generation Partnership Project, "Technical Specification Group Radio Access Network; NR; Physical layer procedures for data (Release 17)," 3GPP TS 38.214 V17.3.0 (Sep. 2022).
Third Generation Partnership Project, "Technical Specification Group Radio Access Network; NR; Physical layer procedures for data (Release 16)," 3GPP TS 38.214 V16.11.0 (Sep. 2022).

* cited by examiner

RADIO (NR) VEHICLE TO VEHICLE (V2X)—METHODS FOR SCHEDULING SIDELINK IN UNLICENSED SPECTRUM

CROSS-REFERENCE TO RELATED APPLICATIONS

This application is a continuation of International Application No. PCT/US2022/047133 filed Oct. 19, 2022, which claims the benefit of U.S. Provisional Application No. 63/257,381, filed Oct. 19, 2021, U.S. Provisional Application No. 63/326,401, filed Apr. 1, 2022, and U.S. Provisional Application No. 63/353,939, filed Jun. 21, 2022, the contents of which are incorporated herein by reference.

BACKGROUND

Vehicular communication is a mode of communication whereby vehicles may communicate with each other directly. One scenario for Vehicle to Everything (V2X) operations is an in-coverage scenario, where a WTRU may receive assistance from a network to start transmitting and receiving V2X messages. Another scenario for V2X operations is an out-of-coverage scenario, where a WTRU may use a pre-configured parameter or parameters to start transmitting and receiving V2X messages.

V2X communication is supported in LTE, and was inspired from previous work on Device-to-Device (D2D) communications. V2X communication services may consist of different types including: Vehicle to Vehicle (V2V) where vehicular WTRUs may communicate with each other directly; Vehicle to Infrastructure (V2I) where vehicular WTRUs may communicate with RSUs/eNBs; Vehicle to Network (V2N) where vehicular WTRUs may communicate with a core network; and Vehicle to Pedestrian (V2P) where vehicular WTRUs may communicate with WTRUs with a special condition (e.g. low battery capacity).

SUMMARY

Methods and apparatuses for scheduling sidelink communications in unlicensed spectrum are disclosed. A method performed by a first wireless transmit/receive unit (WTRU) may comprise: obtaining a grant for transmission on a sidelink (SL); receiving, from a second WTRU or an additional WTRU, a transmission that includes first channel occupancy time (COT) information; on a condition that the grant is for transmission on the SL during a COT associated with the second WTRU or an additional WTRU, determining, from a transmission received from the second WTRU, the additional WTRU, or both the second and the additional WTRU, cast information; performing a listen before talk (LBT) procedure using a set of parameters associated with information received from the second WTRU or additional WTRU; and on a condition that the LBT procedure is successful, transmitting, based on the determined cast information, data that includes second COT information.

The grant may be obtained from a base station. The grant may also be obtained via the first WTRU selecting a grant. The cast information may indicate a unicast cast type or a groupcast cast type. The information received may be the first COT information or the cast information. The set of parameters may be associated with information received from the second WTRU or third WTRU includes a priority of transmission. The set of parameters may be associated with information received from the second WTRU or third WTRU includes an indirection number. The indirection number may be received from the second WTRU or additional WTRU via a sidelink control information (SCI) transmission

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
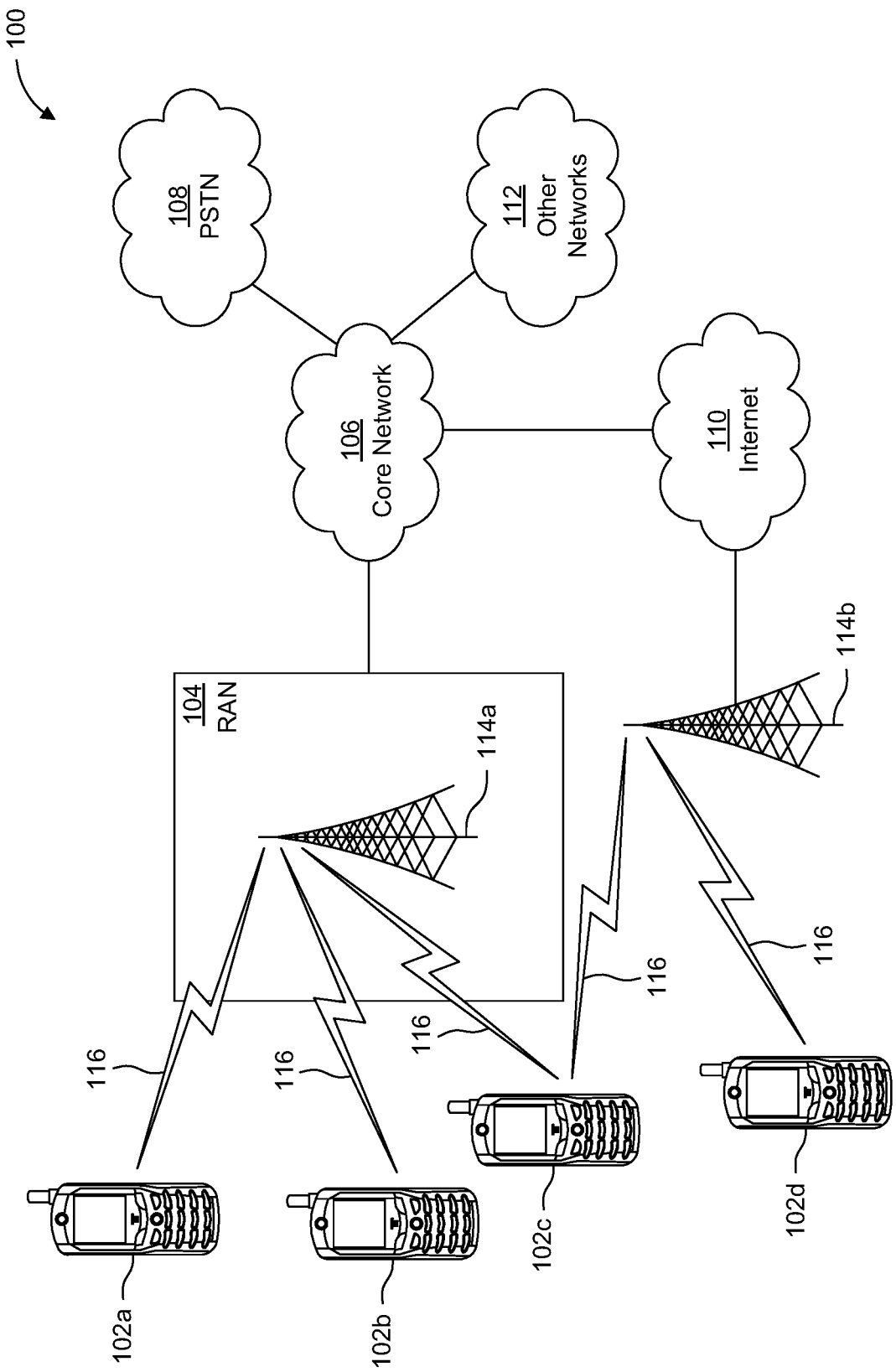
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
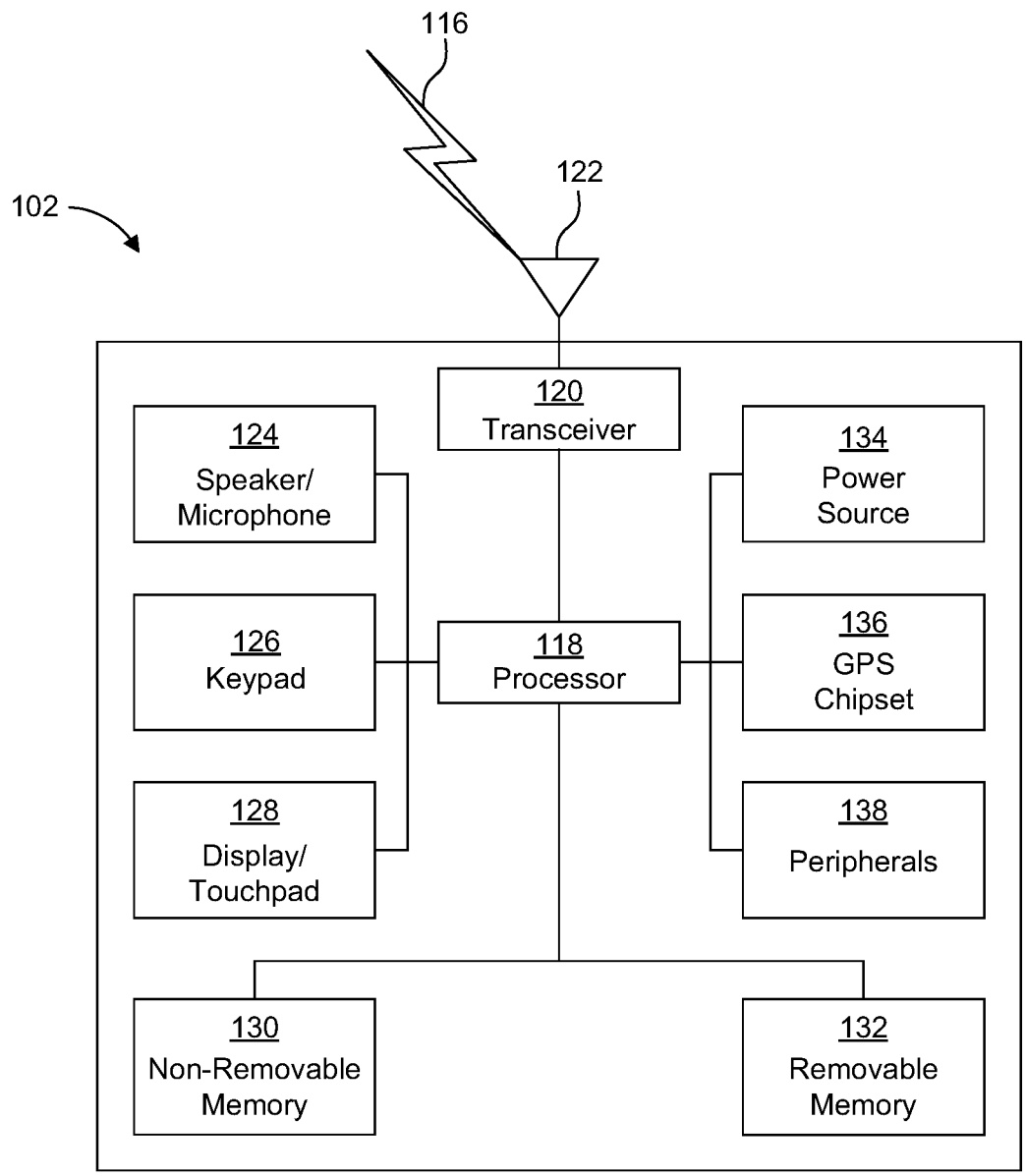
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB)

port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; geolocation sensor, an altimeter, alight sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
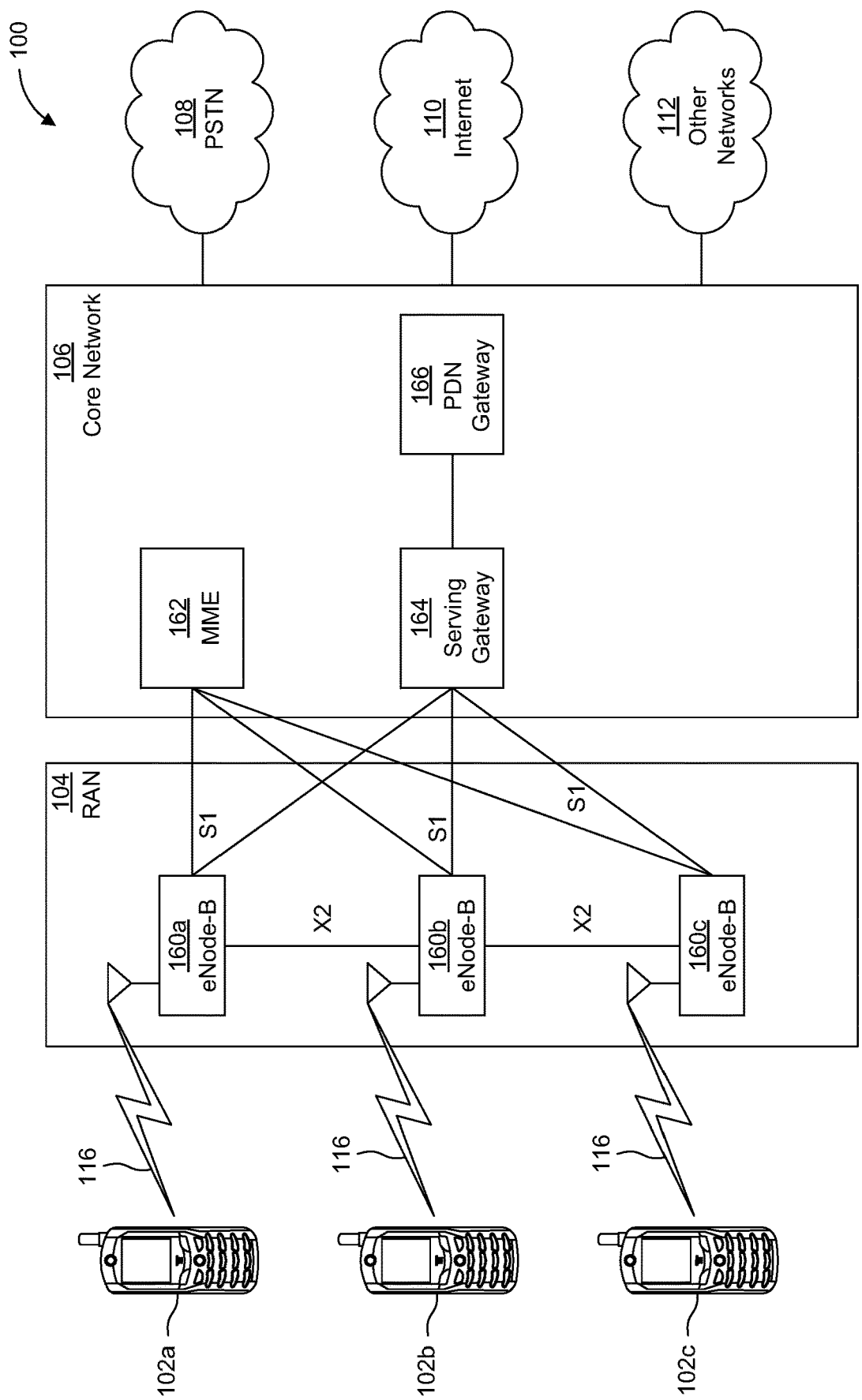
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
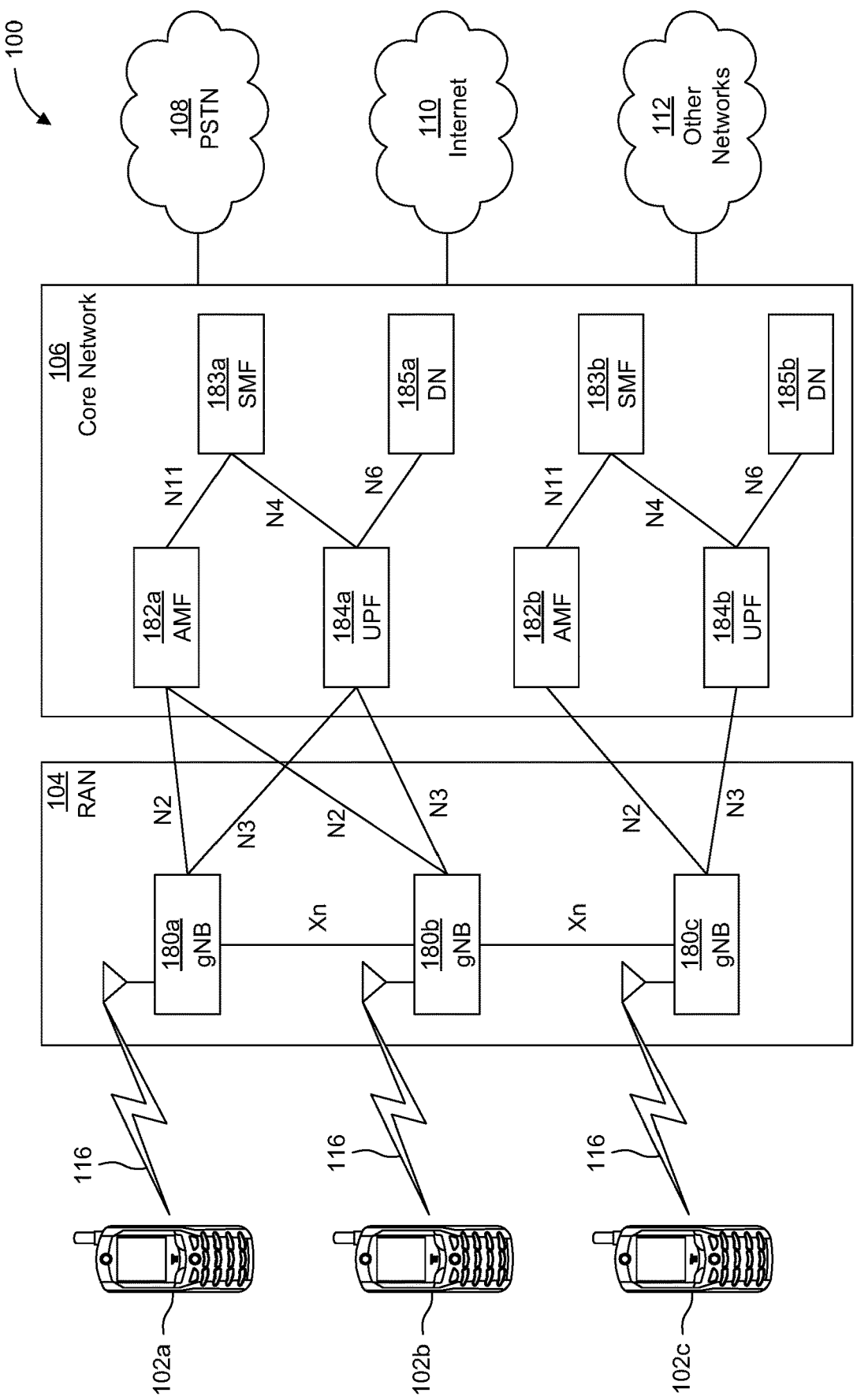
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The Following Abbreviations and Acronyms May be Referred to:
   ACK Acknowledgement
   BSR Buffer Status Report
   CAPC Channel Access Priority Classes
   CBR Channel Busy Ratio
   CG Cell Group
   CG-UCI Cell Group-Uplink Control Information
   COT Channel Occupancy Time
   CSI Channel State Information
   CW Contention Window
   DCI Downlink Control Information
   DCR Direct Communication Request
   DL Downlink
   DRB Data Radio Bearer
   DRX Discontinuous Reception
   DTX Discontinuous Transmission
   FBE Semi-static Channel Access
   gNB gNodeB
   HARQ Hybrid Automatic Repeat Request
   LBE Dynamic Channel Access LBT Listen Before Talk
LCG Logical Channel Group
LCH Logical Channel
LCP Logical Control Prioritization
MAC CE MAC Control Element
MCR Minimum Communication Range
NACK Negative Acknowledgement
PCell Primary Cell
PDB Packet Delay Budget
PDU Protocol Data Unit
PHY Physical Layer
PSCCH Physical Sidelink Control Channel
PSFCH Physical Sidelink Feedback Channel
PSSCH Physical Sidelink Shared Channel
PUCCH Physical Uplink Share Control Channel
QoS Quality of Service
RB Resource Block
RRC Radio Resource Control
RSRP Reference Signal Received Power
RSSI Received Signal Strength Indicator
SCell Secondary Cell
SCI Sidelink Control Information
SL Sidelink
SL UCI Sidelink Uplink Control Information
SR Scheduling Request
SRB Signaling Radio Bearer
SSB Synchronization Signal Block
TB Transport Block
TX Transmitter
UCI Uplink Control Information
UE User Equipment
UL Uplink
V2X Vehicle to Anything
WTRU Wireless Transmit/Receive Unit
MAC Media Access Control
CWS Contention Window Size LTE defines two modes of operation in V2X communication—Mode 3 and Mode 4. In Mode 3, the network may provide a WTRU with a scheduling assignment for V2X sidelink transmission. In Mode 4, a WTRU may autonomously select the resources from a configured/pre-configured resource pool. There are two categories of resource pools defined in V2X LTE: (1) receiving pools, which may be monitored for receiving V2X transmission and (2) transmitting pools, which may be used by WTRUs to select the transmission resource in Mode 4. Transmitting pools are not used by WTRUs configured in Mode 3.

In LTE, the resource pools may be semi-statically signaled to a WTRU via radio resource control (RRC) signaling. In Mode 4, the WTRU may use sensing before selecting a resource from the RRC configured transmitting pool. LTE V2X does not support dynamic resource pool reconfiguration. Pool configuration may only be carried via SIB and/or dedicated RRC signaling.

5G NR inherited the two modes of resource allocation from LTE. Mode 1 resource allocation corresponds to base station (i.e., gNB) scheduled resource allocation. Mode 2 resource allocation corresponds to WTRU autonomous resource allocation. Concept of resource pools and sensing for mode 2 resource allocation was also inherited from LTE.

In 3GPP, access to unlicensed bands is specified under LAA (License Assisted Access). More specifically, downlink (DL) operation, uplink (UL) operation and autonomous UL and other enhancements are specified. LAA utilizes the premise that the unlicensed operation was always anchored with the PCell in the licensed band. Access to the unlicensed bands in the SCell required LBT operation by the WTRU/gNB.

In New Radio, unlicensed spectrum (NR-U) is specified. NR-U supports NR radio access operating with shared spectrum channel access to operate in different modes where either the PCell, PSCell or SCells can be in shared spectrum and an SCell may or may not be configured with UL.

To support NR-U, the following modifications were made to the PHY layer signals and channels: (1) DCI 2_0 is enhanced to provide time and frequency domain channel occupancy time (COT) structure; (2) search space group switching feature is introduced, whereby a WTRU may be dynamically controlled to perform PDCCH monitoring using one of two groups of search space sets; (3) additional PDSCH mapping type B lengths are introduced to enable a transmission at the beginning of a COT immediately once the COT is initiated; (4) a search space may be configured with multiple monitoring locations in frequency domain, to enable PDCCH monitoring across multiple LBT bands; (5) interlace structure is introduced for PUCCH and PUSCH, and PUCCH formats are extended to PRB interlace waveform but contained within one RB set; (6) SRS transmission may be on any symbol of a slot; and (7) a gNB may schedule multiple contiguous PUSCHs by a single DCI format.

WTRUs operating in shared spectrum may perform LBT to access a channel. NR-U supports dynamic channel access (LBE) and semi-static channel access (FBE). In some embodiments, for FBE, only a gNB may initiate a COT at specific times informed by its Fixed Frame Period (FFP) configuration. A WTRU may share a semi-static channel if a gNB DL transmission is detected in an earlier part of the same FFP. In other embodiments, a WTRU may be configured with a WTRU-FFP and may initiate COTs at specific times determined from its WTRU-FFP configuration.

Clear channel assessment (CCA) may be performed in units of 20 MHz. The following types of LBT are specified: (1) CAT4 LBT—Type 1; (2) CAT2 LBT—Type 2A; (3) CAT2 LBT—Type 2B; and (4) CAT1 LBT—Type 2C.

A COT may be initiated using a CAT4 LBT. The COT may be shared by a node that received a transmission from the COT-initiating node, using either a CAT1 LBT or CAT2 LBT, depending on the gap size between the transmissions at the switching point.

LBT parameters may be determined by the Channel Access Priority Classes (CAPC). The CAPC of radio bearers and MAC CEs are either fixed or configurable: (1) fixed to the lowest priority for the padding BSR and recommended bit rate MAC CEs; (2) fixed to the highest priority for SRB0, SRB1, SRB3 and other MAC CEs; and/or (3) configured by the gNB for SRB2 and DRB.

When choosing the CAPC of a DRB, the gNB may consider the 5QIs of all the QoS flows multiplexed in that DRB while considering fairness between different traffic types and transmissions. Table 1 below shows which CAPC should be used for which standardized 5QIs (i.e., which CAPC to use for a given QoS flow). A QoS flow corresponding to a non-standardized 5QI (i.e., operator specific 5QI) should use the CAPC of the standardized 5QI which best matches the QoS characteristics of the non-standardized 5QI.

TABLE 1

Mapping Between Channel Access Priority Classes and 5QI

| CAPC | 5QI |
| --- | --- |
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

Note:
lower CAPC value means higher priority

When the CAPC is not indicated in the DCI and a WTRU performs a Type 1 LBT procedure for the transmission of an uplink TB the WTRU may select the CAPC as follows: (1) if only MAC CE(s) are included in the TB, the highest priority CAPC of those MAC CE(s) is used; or (2) if CCCH SDU(s) are included in the TB, the highest priority CAPC is used; or (3) if DCCH SDU(s) are included in the TB, the highest priority CAPC of the DCCH(s) is used; or (4) the lowest priority CAPC of the logical channel(s) with MAC SDU multiplexed in the TB is used otherwise.

In NR-U, access to the channel assumes a traditional Uu architecture. Specifically, a gNB schedules multiple WTRUs within its coverage, and the gNB is assumed to be fixed in location. Transmissions by the WTRU, which are scheduled by the gNB once the channel is accessed, are intended for the gNB. However, for SL operation in shared spectrum, these assumptions may no longer be valid.

One problem that arises is Mode 1 scheduling issues. In Mode 1 SL, the gNB schedules SL resources to the WTRU. The scheduling DCI may be in shared spectrum (possibly the same shared spectrum as the WTRU transmissions). However, the WTRU's transmissions may be intended for another WTRU and not the gNB. For this reason, the gNB may not be aware of whether the WTRU acquired the channel following the DCI. Furthermore, there may also be scenarios where the gNB may not perform an LBT procedure for access to the channel in which the WTRU will transmit (e.g. SL transmissions by the WTRU in a carrier different than the carrier where the DCI is transmitted). Specifically, the WTRU may not be able to share a COT initiated by the gNB. However, the WTRU may share a COT initiated by a WTRU.

A second problem is that SL architecture may require new methods for determining LBT parameters. LBT parameters such as channel width (CW) size, maximum COT length, and allowed CW sizes depend predominantly on the QoS of the data to be transmitted. While this may be appropriate for a Uu infrastructure/architecture, it may not be appropriate for a distributed architecture typical of V2X. Specifically, V2X may support unicast, groupcast, and broadcast. Furthermore, some transmissions (e.g., broadcast) are typical of unrelated WTRUs, while other transmissions (e.g. unicast) are typical of WTRUs travelling together. These factors may impact the LBT parameters required for such transmissions. They may also affect the COT usage rules, such as whether or not a WTRU may share a COT initiated by another WTRU.

Herein, the term "initiating a COT" may refer to performing a full LBT (e.g., Type 1 LBT). Similarly, "sharing a COT" may refer to performing a reduced LBT (e.g., Type 2 LBT). A WTRU may identify a grant as a Type 1 LBT grant or a Type 2 LBT grant. Determination of whether to perform transmission in a grant, and what type of transmission based on whether the WTRU is initiating or sharing a grant, as discussed herein, may be derived based on the identification of the LBT type to be performed on that grant.

Herein, reference to the WTRU that initiated a COT may refer to the WTRU which performed the SL transmission which created a new COT. Alternatively, the WTRU that initiated a COT may also refer to another WTRU which transmitted within the COT, and whose transmission is detected by a said WTRU. Alternatively, the WTRU that initiated a COT may also refer to another WTRU which transmits or forwards COT information when it decides to share an existing COT.

In the embodiments described herein, LBT behavior may refer to any aspect related to the methods for accessing the channel in shared spectrum (e.g., LBT).

LBT behavior may include CAPC, or similar access class/classification that determines a set of LBT parameters. For example, LBT behavior may include the WTRU selecting the channel access priority class for a given data or transmission type (as described herein). For example, LBT behavior may include the WTRU determining whether to use the UL CAPC table for LBT, or the DL CAPC table for LBT. For example, LBT behavior herein may include the WTRU determining whether it can only use one of the UL/DL CAPC table, or whether either table can be used. For example, LBT behavior may include the WTRU determining whether it can select any access priority class for a transmission, or can only select a specific access priority class for a transmission.

LBT behavior may include the WTRU determining whether it determines CAPC in a first mechanism (e.g., using a first table or a first mapping) or whether it determines CAPC in a second mechanism (e.g., using a second table or a second mapping). The first or second mapping may consist of mapping any property herein with a CAPC. For example, a first mapping may consist of a mapping between PQI (QoS profile indicator) and CAPC and a second mapping may consist of a mapping between logical priority and CAPC.

LBT behavior may include determining between a first rule for obtaining the CAPC from a transmission containing multiple elements each with their own CAPC (e.g., use the highest priority of the CAPCs included in the transmission) and a second rule for obtaining the CAPC from such a transmission (e.g., use the lowest priority of the CAPCs included in the transmission). For example, the WTRU may use the lowest priority of the CAPCs for one type of transmission (e.g., mode 1 transmission), and may use the highest priority of the CAPCs for another type of transmission (e.g., mode 2 transmission). The type of transmission may further consist of any of the SL characteristics defined herein, not necessarily limited to mode, such as priority (of any of the data/control included in the PDU), CBR, etc.

Determination of the rule for obtaining the CAPC of a PDU when data/control with different CAPC are multiplexed into the same PDU may consist of any of: (1) determining whether to select the highest or lowest priority; (2) determining whether to obtain the CAPC from a fixed mapping or a configurable mapping; (3) determining whether to obtain the CAPC from the priority of MAC CE and/or SRB or not; (4) determining whether to obtain the CAPC from the priority of the DRB or not; (5) determining the order of the rules that are applied when determining the CAPC (e.g. considering MAC CE first, considering DRB first, considering SRB first, etc.); (6) determining whether or not to consider the priority of either MAC CE, SRB, or DRB in the determination or not.

LBT behavior may include any existing LBT parameters, such as contention window size (CWS), maximum COT length, allowable CW sizes, CW adjustment procedure, number of CCAs, CCA duration, defer period, and/or FFP parameters applied to the SL. For example, LBT behavior may include WTRU selecting one specific maximum COT length over another. For example, LBT behavior may include the WTRU determining whether to use/consider a parameter (such as defer period) or not as part of LBT. For example, LBT behavior may include the WTRU selecting the CWS from one of a set of configured values, of the WTRU increasing the CWS from one transmission to another by a specific amount, etc. For example, LBT behavior may include deciding whether to use a first CW adjustment procedure (or set of parameters for the procedure) or whether to use a second CW adjustment procedure (or another set of parameters for the procedure). For example, selecting an LBT parameter may include either selecting one of multiple (pre)configured values, or determining a value of the parameter itself directly from a SL characteristic associated with time such as PDB, HARQ RTT, separation between different SL channels, etc.

LBT behavior may also include LBT Type or category. For example, LBT behavior may include the WTRU determining whether to use one LBT type or another and/or one LBT category or not.

LBT behavior may also include LBT beam, beamwidth, or beam direction (including omni-directional). For example, LBT behavior may include the WTRU selecting the LBT beamwidth, the number of channels/subchannels on which LBT is performed to gain access to the channel, etc.

LBT behavior may also include any new LBT parameters that are specific to SL, and which determine channel access behavior, such as any allowable/min/max delays between events for access of a channel, where such events may be related to measurement of energy, or the occurrence of sidelink specific events such as reception/transmission of sidelink channels (e.g., SCI, PSCCH, PSFCH, etc.), control information, or HARQ feedback.

LBT behavior may also include energy thresholds for determination of occupancy of a channel. LBT behavior may also include the number of timeslots or equivalent used for determination of occupancy of a channel.

LBT behavior may also include the number of instances of application of a procedure related to channel access, such as LBT, or portion of LBT (where LBT may an access procedure specific to SL channel, or the same access procedure used in Uu). For example, LBT behavior may include determining the number of times LBT can be attempted before a second action (potentially mentioned herein) can be initiated.

LBT behavior may also include any time instance between the performance of LBT on a channel. LBT behavior may also include the minimum/maximum time since the last transmission before a WTRU can re-use a COT and/or the type of LBT to be performed given this minimum/maximum time (e.g., no LBT, one shot LBT, full LBT, etc.).

LBT behavior may also include whether a WTRU is allowed to share a COT initiated by the base station (e.g., gNB) and/or another WTRU. For example, LBT behavior may include the WTRU determining whether it can share a COT initiated by another WTRU or not. For example, LBT behavior may include the WTRU determining whether it needs to initiate a new COT for a transmission.

LBT behavior may also include the minimum/maximum time between a previous transmission (e.g., from another WTRU or the base station (e.g., gNB)) and the WTRU's own transmission which requires one or another type of LBT to access the channel.

LBT behavior may also include the COT length determined by a WTRU that initiates a COT, and possibly sent in the COT structure information. For example, LBT behavior may include the WTRU selecting one COT length over another COT length (e.g., both of which may be configured). For example, LBT behavior may include whether the WTRU limits the selected COT length to a specific value or not.

LBT behavior may also include whether a WTRU that initiates a COT can share the COT with other WTRU's and whether it indicates this sharing ability in the COT structure information. For example, LBT behavior may include the initiating WTRU determining whether to indicate that a COT can be shared or not. For example, LBT behavior may include the initiating WTRU determining which WTRUs can share the COT, and potentially indicating that in the COT information.

In an embodiment, a WTRU may have multiple independent LBT behaviors and/or procedures. LBT procedures (e.g., CW adjustment) may involve multiple steps where a parameter (e.g., CW applied for a given access priority) is updated following one or more steps. A WTRU performing SL LBT may maintain multiple independent/concurrent LBT procedures which independently update parameters within that procedure. Each independent/concurrent LBT procedure may be associated with a SL factor such as: (1) a cast type (e.g., one procedure for unicast, and one for groupcast/broadcast); (2) an L2 source/destination ID (e.g., one procedure for each destination L2 ID); (3) unicast link (e.g., one procedure for each pair of source/destination ID); (4) QoS flow; (5) resource pool; and/or (6) HARQ enabled and HARQ disabled transmissions.

Any of the LBT procedures related to LBT behavior described above may have multiple independent/concurrent instances of the LBT procedures. A WTRU that performs LBT for a transmission with a specific factor may then use the parameters associated with that instance of the procedure.

A WTRU may have different CW adjustments for HARQ enabled/disabled transmissions. In one embodiment, a WTRU may perform CW adjustment differently based on whether a transmission is associated with HARQ enabled or HARQ disabled transmissions. For example, a WTRU may use a different adjustment parameter/value following transmissions that include HARQ feedback enabled vs HARQ feedback disabled. In another example, a WTRU may set the CW to a default or configured value following a transmission with HARQ feedback disabled. In another example, a WTRU may increase/decrease the CW by a default/configured amount for a transmission with HARQ feedback disabled. In another example, a WTRU may ignore all transmissions with HARQ feedback disabled in the determination of the CW update. In another example, a WTRU may set the CW to the initial value following transmission with HARQ feedback disabled. In another example, a WTRU may decrease the CW adjustment by a certain amount depending on the number of HARQ disabled transmissions in a time window, or since the last HARQ enabled transmission. In another example, a WTRU may reset the CW to a default/initial value following a transmission with HARQ feedback disabled. In another example, a WTRU may be configured to increase the CW for a NACK. Further, if HARQ feedback is disabled, the increase of the CW may be associated with a function (e.g., half, double, etc.). The function may also depend on other factors at the WTRU that are not static. In another example, the determination as to whether the WTRU increases the CW by a first amount or a second amount following a HARQ feedback disabled transmission may depend on whether the previous transmission resulted in an ACK or in a NACK.

A WTRU may determine whether to perform transmissions with HARQ feedback enabled or disabled based on the CW adjustment status, which may consist of any of the value of the CW, the number of times the CW was increased since the last reset of its value, whether the value is above a (pre)configured threshold or not, etc. For example, a WTRU may perform a transmission with HARQ feedback enabled when the value of the CW is above a threshold. For example, the WTRU may perform a transmission with HARQ feedback enabled when the number of consecutive increases in CW since the last reset is above a threshold.

Mode 1 scheduling for SL may depend on the ability of the base station (e.g., gNB) to have access to channel availability information (e.g., information about a COT acquired by the SL 3GPP system). In one embodiment, a WTRU may determine whether to perform an LBT procedure on a SL, and the LBT behavior (e.g., LBT type) based on implicit/explicit indication in a SL scheduling DCI or other message from the base station (e.g., gNB).

For example, A WTRU may receive an indication that an LBT procedure is needed/not needed and/or the type of LBT that is needed in the DCI scheduling the SL grant. A WTRU may determine whether LBT is needed/not needed or the type of LBT based on the time difference between the reception of the scheduling DCI, and the SL resource being scheduled. Here, for example, the WTRU may be (pre)configured with a mapping of LBT type to time difference between scheduling DCI and SL resource, and may use that time difference to determine the LBT type to perform. For example, the WTRU may assume no LBT is required, or short LBT is required if the time between the scheduling DCI and the SL resource is below a threshold.

A WTRU may receive an explicit indication that an LBT procedure is needed/not needed and/or the type of LBT that is needed in a separate DCI. The WTRU may be configured with a SL configured grant, and may receive a scheduling DCI prior to any instance of that configured grant to indicate whether an LBT procedure is needed/not needed and the type of LBT.

Furthermore, a combination of the above examples is possible. For example, a WTRU may receive an explicit indication whether to perform Type 1 LBT, or whether to perform a LBT type that is determined by the time difference between the scheduling DCI and the SL grant timing. Such explicit indication may be in a DCI. Such explicit indication may be provided as part of the RRC configuration to the WTRU.

The above conditions may further depend on whether the carrier/BW on which the DCI is received is the same as the carrier on which the SL is scheduled. Specifically, a WTRU may assume that no LBT procedure is required, or that a short LBT procedure is required if the time between the scheduling DCI and the SL resource is below a threshold (only in the same carrier case).

In another embodiment, a WTRU may determine the LBT parameters to use based on a combination of information in the DCI received from the network and SCI received from another WTRU. For example, if the DCI does not explicitly indicate the LBT type, the WTRU may use a first LBT if its grant is within the COT indicated in an SCI. If the DCI does explicitly indicate the LBT type, the WTRU may follow the DCI indication.

In another embodiment, a WTRU may determine the LBT parameters as a function of the source of the received SCI. Specifically, the WTRU may determine the LBT type or parameters as a combination of: (1) CAPC or similar information in DCI and/or SCI; (2) time gap between SCI transmissions detected on SL compared with a threshold (such threshold may be determined or derived by the information in the DCI, in addition to other SL specific information described herein); and/or (3) time gap between DCI and the SL grant. The WTRU may determine how it combines such information based on the information in the DCI, or similar information provided in RRC signaling.

In another embodiment, a WTRU may determine the LBT parameters based on whether the DCI and the SL transmissions are on the same (unlicensed) carrier or not. Specifically, a WTRU receiving DCI on the same unlicensed carrier as SL transmissions may interpret reception of the DCI as initiation of a COT by the base station (e.g., gNB). Alternatively, if the DCI is received on a carrier which is different than the SL carrier, the WTRU may depend on SL transmissions to initiate a COT or determine whether a COT is initiated by another WTRU.

The LBT type or parameters may include at least one of: (1) LBT category (e.g., LBT CAT1, LBT CAT2, LBT CAT3 or LBT CAT4); (2) the CCA duration; (3) the CW size (this may include the maximum CW size or the currently used CW size); (4) the LBT beam direction or beamwidth (e.g., the LBT may be omni-directional); (5) the COT duration (this may include the max COT duration); (6) the defer period duration; and/or (7) the FFP configuration.

For example, if a WTRU receives CAPC or similar information in DCI, it may determine the LBT type to be used based on the time difference between the DCI and the SCI. This case may correspond to the scenario where the base station (e.g., gNB) has itself performed LBT to transmit DCI. If the WTRU does not receive CAPC in DCI, the WTRU may determine the LBT type to perform based on SCI transmissions. Specifically, if the WTRU does not find a COT initiated by another WTRU to share, it may perform a type 1 LBT. Otherwise, if it shares a COT, it may perform an LBT where the type may be determined based on the time gap between the WTRUs grant and the last SCI/transmission by another WTRU. Similar to the above, the WTRU may also determine the type of data (e.g., priority, cast, etc.) based on similar rules.

COT information by a WTRU (e.g., in the form similar to CG-UCI) may be transmitted by a WTRU in SCI. A WTRU may transmit such COT information in each SCI. Alternatively, the WTRU may transmit the information in a subset of SCI transmissions, such as periodically, every x transmissions, every x time period, in SCI transmissions that initiate a COT, upon reception of an SCI which initiates a COT, or where certain COT information is included.

A WTRU may transmit COT information in other PHY channels (other than PSCCH for example). Alternatively, a WTRU may transmit COT information in a SL MAC CE, a SL RRC message, an inter-WTRU resource coordination message, or similar message. A WTRU may transmit the COT information it determines when it initiates a COT.

Alternatively, or in conjunction, a WTRU may transmit the COT information it receives from the base station (e.g., gNB) and/or other WTRUs (e.g., when it decides to share the COT). For example, a WTRU may transmit the COT information received from the base station (e.g., gNB) in its own SL transmission, or derive related COT information to transmit in SL from the information received from the base station (e.g., gNB). COT information may include any COT information described herein. For example, a WTRU may receive a remaining COT length from the base station (e.g., gNB). The WTRU may calculate the remaining COT length after its SCI transmission (e.g., by subtracting the time gap between the DCI reception from the received remaining COT length), and include this information in its own SCI transmissions or a SL MAC CE transmitted along with its own transmission. Alternatively, a WTRU may decide to transmit COT information from another WTRU. In some instances, the WTRU may decide to transmit COT information from another WTRU even if it does not share the COT in question.

In one embodiment, a WTRU may report COT information received from another WTRU, or determined by the WTRU based on reception from another WTRU, to the base station (e.g., gNB). For example, such report may be sent in PUCCH, SR, in the form of HARQ feedback, CG-UCI, MAC CE or RRC message. The COT information may include any of: (1) COT structure (e.g., time/frequency resources associated with the COT); (2) remaining COT duration; (3) CAPC associated with COT (or used to initiate the COT); (4) LBT statistics collected by the WTRU (e.g., number of occupied/available resources within the CW); (5) COT type (as per definition herein) or properties of the COT which determine its usability property of the WTRU or transmission which initiated the COT or transmitted the COT information, such as, L2 ID, WTRU type (e.g., sensing/non-sensing WTRU, DRX WTRU, release or profile of a WTRU), IC/OOC WTRU, and/or Cell ID associated with an IC WTRU (possibly operating in mode 1); (6) RSSI measurements of the channel/carrier/LBT bandwidth; (7) channel occupancy; (8) CCA outcomes; (9) energy detection threshold used to initiate the COT; (10) LBT type or parameters used to initiate the COT; (11) FFP parameters; (12) set of LBT BWs associated to the COT (which may include the set of BWs on which LBT was performed, the set of BWs on which LBT was deemed successful, or the set of BWs on which LBT was deemed to have failed); (13) occupied/available resources (based on sensing) located within the COT; (14) QoS information (e.g., priority) associated with the transmission that initiated the COT; (15) the expected gap between two sidelink transmissions, or the presence of a gap between two sidelink transmissions; (16) whether the transmission that initiated the COT is an initial transmission or retransmission; (17) the identity of the node that initiated the COT; (18) whether the COT has been shared by the WTRU; and/or (19) whether the COT may be shared by the base station (e.g., gNB) or another WTRU.

The COT information may also include information about when (i.e., the time location) a transmission by one or more other WTRUs, or by the said WTRU, within the COT will be terminated (For example, a WTRU may determine the presence of a COT initiated by a WTRU based on reception of the SCI indicating initiation of a COT by transmission of that SCI. The SCI may further contain the duration of the COT. One or more SCIs received by the said WTRU may further contain information associated with the intended usage of resources within the COT by one or more other WTRUs. For example, a WTRU may determine (e.g., based on SCI transmissions or information in the SCI) the timeslot within a COT in which the SL resources within the COT will become available, and may send the base station (e.g., gNB) this timing information);

The COT information may be reported periodically. For example, the WTRU may have periodic resources on which to transmit whether there is an ongoing COT and any COT information associated to the COT.

The WTRU may be triggered to report the COT information to the base station (e.g., gNB). The triggers may include at least one of: (1) reception of a DCI; (2) contents of a DCI (e.g., a field in the DCI may trigger the report of COT information); (3) reception of an SCI; (4) contents of an SCI (e.g., a field in the SCI may trigger the report of COT information) (5) transmission of an SR to use the COT; (6) based on outcome of LBT. For example, the WTRU may report COT information if it has succeeded or failed LBT to share or initiate the COT; and/or (7) based on a request to initiate a different COT. The WTRU may report one or more COT information based on the reception of a transmission from one or more other WTRU(s).

In one embodiment, a WTRU may report COT information on a UL resources associated with a COT that was initiated/used by the WTRU itself on SL, possibly associated with a SL grant provided by the network. Such report may be sent in PUCCH, SR, in the form of HARQ feedback, CG-UCI, MAC CE or RRC message, for example. Such information may include any of the information similar to the information in the previously described embodiment (e.g., WTRU reporting information received from a peer WTRU). Additionally, the WTRU may further report: (1) time instance in which a COT was initiated/should end; (2) LBT statistics collected by the WTRU (e.g., number of occupied/available resources within the CW); (3) HARQ process ID of the transmission that initiated the COT; (4) whether a WTRU was successful/unsuccessful in initiating a COT (if not successful, the reason, for example, may be an error reason, or some statistics associated with the failed LBT, such as the RSSI, number of available resources in the CW, etc.); (5) whether the WTRU was successful/unsuccessful in transmitting in a shared COT; (6) whether the WTRU acquired the channel because it initiated its own COT, or shared a COT with another WTRU; (7) the amount of time remaining in the COT (which the WTRU was able to share), or whether such time is above/below a threshold (where such threshold may be dependent on a property of the data to be transmitted by the WTRU (e.g., priority)); (8) the number of times the WTRU was successful/unsuccessful in initiating a COT, possibly over a specific time, possibly associated with a specific CAPC or LBT behavior; (9) and/or the L2 ID(s) associated with the transmission that initiated or shared the COT.

The WTRU may report COT information periodically or aperiodically. The period or aperiodic reporting may reuse methods described herein for the reporting of COT information received from a peer.

In one example embodiment, a WTRU may be configured with one PUCCH resource (possibly associated to a SL grant) for indicating whether LBT was successful, and another PUCCH resource (possibly associated to the same SL grant) for reporting HARQ ACK/NACK to the base station (e.g., gNB). Specifically, if the WTRU is able to acquire the SL channel at the grant, it may send ACK in the first PUCCH resource, and may then send ACK/NACK on the second PUCCH resource based on the SL HARQ feedback from the RX WTRU. Alternatively, the information provided on the first PUCCH resource may indicate: (1) the transmission by the WTRU on the grant was achieved by sharing an existing COT (e.g., indicated using a first codepoint) or by initiating a new COT (indicated using a second codepoint), or the channel was not acquired for the grant (indicated using a third codepoint) or (2) the WTRU acquired a COT with a remaining COT length that is larger (using a first codepoint) or smaller (using a second codepoint) than a threshold, where the threshold may be based on the priority of the data in the buffers, included in the PDU, or reported in the BSR. The WTRU may also indicate (using a third codepoint) that it did not acquire the channel for the grant.

In another method, a WTRU may transmit feedback on a single PUCCH resource. The feedback may indicate one of three states, ACK, NACK, or DTX, where DTX may indicate that the transmission was not performed due to failed LBT.

In one example embodiment, a WTRU may determine, for a Mode 1 SL grant, whether it can acquire a channel for that grant, and whether to use an existing COT, or initiate a new COT. Such determination is described further herein. Following such determination, a WTRU may determine the information to be provided to the base station (e.g., gNB) following the grant (e.g., in the form of UCI, for example). If the WTRU shares an existing COT, the WTRU may receive the COT structure information from another WTRU (e.g., in an SCI transmitted within that COT) and send the COT structure (e.g., remaining COT length, CAPC, etc.) to the base station (e.g., gNB) in the UCI.

If the WTRU initiates its own COT, the WTRU may create UCI indicating the COT structure based on the CAPC of the data included in the transmission and/or LBT parameters used to acquire the channel, and send the created UCI to the base station (e.g., gNB). If the WTRU is unable to acquire the channel, the WTRU may indicate such in the UCI, and may include additional information about the reason for failing the access, such as: (1) LBT failure when trying to acquire a new COT, and potential LBT statistics associated with the failure; (2) LBT failure when trying to acquire an existing COT initiated by another WTRU, and potential LBT statistics associated with the failure (e.g., gap between transmissions and type of LBT that the WTRU was required to perform); (3) remaining COT length of an existing COT at the time of the grant is shorter than required, and therefore not acquired by the WTRU; and/or (4) L2 ID(s) associated with the transmission that initiated the COT.

In one example, a WTRU may be configured with SR resources to indicate failure to acquire the SL channel. The WTRU may further be configured with different SR configurations, depending on the priority of the data multiplexed in the PDU that was to be transmitted on the grant in which LBT failed.

A WTRU may trigger/send a report of COT information described in the embodiments described above. A WTRU may trigger/send a report of COT information when the WTRU is unable to acquire the channel, possibly associated with one or more SL grants or configured SL grant. For example, a WTRU may send HARQ NACK, SR, or similar UL transmission if the WTRU is unable to successfully perform an LBT procedure on a resource associated with a SL grant. For example, a WTRU may perform a UL transmission when the first/last resource associated with a grant (e.g., the first/last retransmission resource for a grant) LBT procedure fails. For example, the WTRU may perform a UL transmission when it is unable to acquire at least x resources associated with a SL grant by the network, where x may be (pre)configured, and may depend on one or more other factors described herein.

A WTRU may trigger/send a report of COT information when the WTRU receives information about a new possible COT it was able to initiate (based on its own channel access) or detect (based on reception from another WTRU). In one example, a WTRU may transmit COT information to the base station (e.g., in a MAC CE) upon determination of a COT initiated by another WTRU (e.g., based on SCI reception from another WTRU).

In another example, a WTRU may transmit COT information to the base station (e.g., gNB) (e.g., in a MAC CE) upon a change in the COT information previously reported to the base station. For example, the change in the COT information may be an occurrence (e.g., due to the lack of SL transmission) of a gap within the COT which is larger than a (pre)configured threshold. The change in the COT information may be the reception of a message (e.g., from a second WTRU) indicating an expected COT length which is shorter that the COT length initially indicated for the same COT (possibly by a first WTRU).

A WTRU may trigger/send a report of COT information when the WTRU is configured with conditions (e.g., via RRC configuration, or via a MAC CE) on whether or not to report COT information received from other WTRUs or determined by the WTRU. For example, the conditions may include: (1) report COT information (e.g., for a newly detected COT) as long as the remaining COT length is smaller/larger than a threshold; (2) report COT information as long as the CAPC is above/below a threshold; (3) report COT information as long as the maximum time gap in the (potentially planned) transmissions within the COT is above/below a threshold; and/or (4) report COT information if, compared to the previous report, the information of the (potentially same) COT has changed, possibly by a specific amount (e.g., COT length changes by a certain amount).

The thresholds for the above conditions may be dependent on the data available for transmission by the WTRU, such as the priority, remaining PDB, or measurements of the channel such as CBR. For example, the WTRU may determine a threshold COT length based on the priority of data pending for transmission at the WTRU. If the WTRU detects a COT (based on reception of information from another WTRU) whose COT length is larger than the determined threshold, the WTRU may report the COT information to the base station.

A WTRU may maintain multiple COTs. For example, a WTRU may maintain a first COT associated with a first node (e.g., base station) and a second COT associated with a second node (e.g., another WTRU). The WTRU may maintain different COT parameters for each COT. For example, the WTRU may share a first COT and may initiate a second COT. A WTRU, for example, may only, use a COT associated with a base station (e.g., gNB) for a transmission to the base station (e.g., gNB). A WTRU may share a COT associated with a base station (e.g., gNB) for a transmission to another WTRU. A WTRU may indicate a set of COT information in a transmission to the base station (e.g., gNB). One of the COT information transmitted to the base station (e.g., gNB) may be associated to the COT associated with the base station (e.g., gNB).

In one embodiment, a WTRU may initiate a LBT procedure on a SL upon indication to the network that it has SL data to be transmitted. For example, a WTRU may be (pre)configured with a time instance following transmission of SL SR/BSR in which to initiate LBT. Such time instance may depend on properties of the data to be transmitted, such as QoS, cast, or the information provided in the BSR (e.g., LCG, destination index, etc.), etc.

In another embodiment, a WTRU may initiate an LBT procedure on a SL upon reception of a grant in DCI, or some time period following reception of the DCI. The time period may be (pre)configured, indicated in the DCI, and/or be dependent on measurements of the SL and/or QoS of the transmission.

In another embodiment, a WTRU may be provided with multiple SL grants (possibly with a single DCI, possibly with a DCI and a pattern configured by RRC or MAC CE). The multiple SL grants may be explicitly indicated in the DCI. Alternatively, the multiple SL grants may follow a predefined time/frequent pattern. The purpose of the grants may be to allow the WTRU to attempt LBT procedures on a SL multiple times. Specifically, the WTRU may attempt LBT on the first grant. If LBT fails, it may attempt LBT on the second grant, and so on.

The WTRU may further inform the network if it successfully accesses the channel with LBT (e.g., using UCI or COT information described herein). A WTRU may further cancel any subsequent grants following channel acquisition on a previous grant. Alternatively, the WTRU may be configured to determine whether to keep or cancel the subsequent grants based on: (1) the amount of data in the buffers (e.g., if the WTRU has data available for transmission, possibly associated with a specific priority, it may maintain one or more of the subsequent grants); (2) the congestion of the channel (e.g., if the CBR is above a threshold, the WTRU may cancel the subsequent grants, otherwise, it may keep them); (3) the number of subsequent grants remaining (e.g., the WTRU may be configured with a maximum number of subsequent grants it can maintain and may drop the remainder; (4) the priority of the data in the buffers; (5) any combination of (1) to (4) above; and/or (6) any other conditions described herein (for example, associated with the multi-LBT occasion described herein).

A WTRU may determine whether LBT is required prior to the resources of an upcoming grant in a set of multiple SL grants, as a function of whether LBT was successful before a prior grant in the same set of multiple SL grants and the duration since the most recent successful LBT and whether there is a gap prior to the upcoming grant.

A WTRU scheduled with multiple SL grants may select whether to share an existing COT or initiate a new COT based on a parameter of one or more SL grants in a set of multiple SL grants. For example, a WTRU may determine whether to share an existing COT as a function of the amount of grants in the set of multiple SL grants that may be transmitted within the COT. For example, if a WTRU has n SL grants in a set of SL grants and the ongoing COT has enough resources for the transmission of m SL grants, the WTRU may determine whether to share the ongoing COT or initiate a new COT as a function of m and n. The WTRU may determine whether to share an ongoing COT or initiate a new COT as a function of the priority of the transmissions in one or more of the set of multiple SL grants.

Transmission of COT information on SL may depend on whether the WTRU initiates, or shares a COT.

A transmitting SL WTRU may transmit COT information (e.g., COT structure) on a SL, with its own transmissions. For example, the WTRU may include COT information in SCI, SL MAC CE, a dedicated PHY channel, SL RRC, UCI, CG-UCI, SL-UCI or a combination thereof. COT information may include the information described herein, or the COT information in prior art, or a combination thereof.

In an embodiment, a WTRU may determine whether to create its own COT information for transmission, or forward/transmit COT information received from another WTRU or base station based on whether the WTRU initiates a COT, or shares a COT initiated by another WTRU or base station. Specifically, if the WTRU's grant or potential grant does not fall in an existing COT, the WTRU may initiate its own COT, and may create COT information (COT structure) based on the LBT it used to create the COT within its own transmission.

If the WTRU's grant or potential grant falls within a COT initiated by the base station or another WTRU, the WTRU may transmit the COT information received in the transmission of the other WTRU or base station (i.e., the COT structure indicated by the other WTRU). A WTRU may determine whether to share an existing COT or initiate a new COT as a function of information received in the COT information from another WTRU for an existing COT, where the information received in the COT information is described herein.

A WTRU may determine its LBT behavior based on one or a combination of factors associated with its own transmission, and/or with its own reception (e.g., when sharing a COT initiated by another WTRU). Here, the term combination, may refer to using two or more factors in determining the LBT behavior. Combination may refer to excluding one behavior due to the presence of one factor, and selecting from the remaining behaviors based on other factor(s). Combination may refer to determining one LBT behavior based on a first factor, and another LBT behavior based on a second factor. Combination may refer to determining the number or type of LBT behaviors to determine based on a factor, while selecting the behaviors based on another factors.

For example, any of the below factors may be used to determine the LBT behavior (e.g., LBT parameters) when initiating a COT. Additionally, any of the below factors may be used to determine whether a WTRU can share an existing COT and/or what LBT behavior (e.g., LBT parameters) to use when accessing the channel to share the COT. Furthermore, the LBT behavior to be used when sharing a COT may depend on the factors below associated with the transmission that initiated the COT and/or the transmission that is planned by the WTRU that will be sharing the COT. For example, in the case of L2 ID, it could be the L2 ID(s) used to initiate the COT and/or the L2 ID(s) of the transmission that will share the COT).

Factors to determine the LBT behavior (e.g., LBT parameters) when initiating a COT may include: (1) cast type; (2) source/destination of a sidelink transmission; (3) HARQ behavior; (4) QoS of a transmission/reception; (5) (minimum communication range (MCR) related quantity; (6) zone-related quantity; (7) CBR-related quantity; (8) distance between the two WTRUs; (9) group related quantity; (10) message type; (11) SL channel or channel type; (12) transmission or retransmission type; remaining PDB or time latency requirement; (13) based on any contents included in the SCI associated with the transmission; (14) any parameter related to sensing mechanism and/or sensing results; (15) associated with a resource pool; (16) allocation mode; (17) the time between a previous transmission and a WTRU's own transmission; (18) member ID in groupcast; (19) L2 source/destination ID; and/or (20); relative to reservation of resources by the WTRU or other WTRUs.

Cast type may refer to whether a planned or executed transmission corresponds to unicast, groupcast, or broadcast. Cast type may refer to whether a received transmission corresponds to unicast, groupcast, or broadcast. Cast type may refer whether a WTRU has data of a specific cast type available for transmission. Cast type may refer to whether a WTRU has a specific unicast link established. Cast type may refer to whether the WTRU is interested in a service associated with a specific cast type. For example, the WTRU may use a first LBT type or category, or number of timeslots to determine occupancy when a transmission/reception is unicast, and may use a second LBT type or category, or number of timeslots to determine occupancy when transmission/reception is broadcast/groupcast. For example, the WTRU may use the DL CAPC table for unicast transmissions and may use the UL CAPC table for groupcast/broadcast transmission. For example, two WTRUs with a unicast link may negotiate (possibly using PC5-RRC signaling) which of the WTRUs uses the DL CAPC table and which uses the UL CAPC table. For example, a WTRU may be configured with one or more COT lengths (possibly associated with other factors such as priority, etc.) to use for COT initiation for unicast transmissions and another one or more COT lengths to use for COT initiation for groupcast/broadcast transmission.

Source/destination of a sidelink transmission (such as L2 ID) may refer to whether the L2 ID matches some (pre) configured L2 ID or set of IDs for which a specific LBT behavior is required. Source/destination of a sidelink transmission may refer to whether a reception contains or is associated with one or any L2 ID. For example, a WTRU may receive (from the network or from upper layers) and indication of whether a L2 ID can allow COT sharing and/or the LBT behavior and/or the indirection number (or similar) to be applied for that L2 ID transmission, and may determine the LBT behavior following transmission/reception of a PDU intended for that L2 ID. For example, a WTRU may share a COT with a peer WTRU if the COT was initiated by a transmission by the peer WTRU to a L2 ID for which the WTRU is interested in receiving the L2 ID. For example, a WTRU may be allowed to transmit with reduced LBT requirements following reception on an SL (i.e., LBT required to share the COT) if the L2 ID associated with the transmission is the same as the reception L2 ID (for example, the transmission is performed to the same unicast link, the transmission is performed to the same groupcast L2 ID, etc.).

A WTRU may receive COT information from multiple peer UEs and may determine its own LBT behavior and/or whether to initiate/share a COT based on one or more of them. In one example, a WTRU may use the COT information received from the peer WTRU associated with the longest/shortest indicated COT length, the highest/lowest indicated priority, the priority which matches a condition associated with the transmitting WTRUs own data priority, the closest peer WTRU (in terms of distance between the peer WTRU and the transmitting WTRU that receives the COT information), etc.

In another example, a WTRU may determine whether to use one rule (e.g. the COT information associated with the minimum or maximum, with the highest/lowest priority, etc.) or another based on other factors herein such as the priority of the WTRUs own transmission. For example, for high priority transmissions, the WTRU may use the COT information of the longest COT length, and for low priority transmissions the WTRU may use the COT information of the shortest COT length.

HARQ behavior may refer to whether a transmission/reception is associated with HARQ enabled or HARQ disabled. HARQ behavior may refer to the (pre)configured HARQ delay or RTT on sidelink. HARQ behavior may refer to whether HARQ specific channels (PSFCH or PUCCH) are configured or not. HARQ behavior may refer to a number of, potentially consecutive, HARQ feedbacks, possibly of a specific type (ACK/NACK/DTX) transmitted or received. HARQ behavior may refer to the required time to send one or more HARQ feedbacks. HARQ behavior may refer to the type of groupcast HARQ (e.g., ACK/NACK or NACK only) that is being used. HARQ behavior may refer to whether the WTRU transmits HARQ ACK or HARQ NACK.

QoS of a transmission/reception may refer to the priority of a transmission. QoS of a transmission/reception may refer to a (pre)configured parameter associated with a SLRB. QoS of a transmission/reception may refer to PQI, or similar QoS parameters associated to a QoS flow. QoS of a transmission/reception may refer to whether a transmission is on an SL SRB, or an SL DRB. For example, a WTRU may assume a first set of LBT parameters to acquire the channel when a transmission is associated with a first priority, and a second set of LBT parameters to acquire the channel when a transmission is associated with a second priority. For example, a WTRU may assume the COT length, or the time without performing a full LBT following reception of another WTRU is a first value if the received priority is a first priority, and may assume a second value if the received priority is a second priority.

MCR Minimum communication range (MCR) related quantity may refer to the value of the MCR transmitted/received by a WTRU. MCR related quantity may refer to whether MCR is transmitted or not. MCR related quantity may refer to whether a WTRU determines it is within the MCR of a transmission. MCR related quantity may refer to the distance remaining before a WTRU is outside/inside the MCR. MCR related quantity may refer to the computed distance between a transmitter and receiver. The WTRU may determine or modify its LBT parameters for transmission following reception from another WTRU based on the computed distance between that WTRU and itself. The WTRU may always perform type 1 LBT as long as the distance is above a threshold.

A WTRU may determine its LBT parameters based on the MCR of a transmission. Specifically, the WTRU may be configured with a CW length (or other parameter affecting its LBT) for an MCR or range of MCR. For a TB associated with an MCR, the WTRU may select the appropriate CW length. A WTRU may be configured with an offset (e.g., increase in CW length) to be applied for each increase in MCR from a specific baseline value. A WTRU may determine whether to use an UL CAPC table or a DL CAPC table based on whether a transmission has an MCR and/or the value of the MCR (e.g., above or below a threshold). A WTRU may determine the length of a COT to create based on the number of WTRU is the group (as determined by upper layers).

Zone-related quantity may refer to the specific zone in which the WTRU is located, and whether such zone is associated to (e.g., part of a list of) one or more (pre) configured zones. Zone-related quantity may refer to whether a WTRU is located in the same zone as another WTRU. Zone-related quantity may refer to the configured zone sizes.

CBR-related quantity may refer to the measured CBR at a WTRU. CBR-related quantity may refer to whether CBR is below or above a threshold. CBR-related quantity may also refer to whether CBR can be measured or not. CBR-related quantity may also refer to the time period over which CBR is measured.

The distance between two WTRUs may refer to the determined distance between two WTRUs (e.g., WTRU initiating the COT and the WTRU sharing the COT), which may be computed by the transmitted zone indication in the SCI, for example.

Group-related quantity may refer to the number of WTRUs within a group. For example, Group-related quantity may refer to the group ID configured by higher layers. Group-related quantity may also refer to the groupcast HARQ feedback type (ACK/NACK or ACK only). For example, a WTRU may determine the length of a COT to create based on the group size (indicated by upper layer). Specifically, a WTRU may be configured with a different COT length for one or a set of group sizes, and may select the COT length based on this configuration. For example, a WTRU may determine whether to share a COT initiated by a peer WTRU based on whether the peer WTRU's transmission was performed to a L2 ID. The WTRU may share a COT initiated by a peer WTRU if the COT was initiated by a L2 ID in which the WTRU is interested. Further, the WTRU may determine its LBT behavior differently if the COT was initiated by a L2 ID in which the WTRU is interested and/or the WTRU is assigned a group number for that L2 ID. For example, a WTRU initiated COT may include the group member ID within the transmission. A second WTRU may determine whether it can share the COT with the initiating WTRU and/or may determine the LBT behavior required for transmission based on its own group member ID compared to the group member ID of the initiating WTRU (e.g., the difference is smaller than a threshold).

Message type may refer to whether a transmission/reception consists of a specific message associated with sidelink, such as a direct communication request (DCR) or other message associated with unicast link establishment, or contains a specific MAC CE such as a CSI report or inter-WTRU coordination message. For example, a WTRU, upon reception/transmission of a DCR message, may assume no LBT is required, or only a specific LBT is required until establishment of the unicast link for which the DCR message was initiated SL channel or channel type may refer to whether a transmission/reception consist is performed on a specific SL channel, for example, SL-SSB, PSCCH, PSSCH, PSFCH, etc.

Transmission or retransmission type may refer to whether the transmission/reception consists of an initial transmission or a retransmission. For example, this may refer to the retransmission number associated to the retransmission.

Remaining PDB or time latency requirement may refer to the remaining PDB associated with a transmission at the time of LBT may refer to an amount of time relative to T2 (or any sensing-based window or timeframe). Remaining PDB or time latency requirement may refer to a CSI feedback latency bound, or remaining time in that latency bound at the time of transmission. Remaining PDB or time latency requirement may refer to a relation between the remaining PDB (or an equivalent metric such as priority), and the duration of a COT to be shared.

Contents included in the SCI associated with the transmission may refer to the presence of absence of any value in the SCI. For example, this may refer to the value of any field in the SCI. Contents included in the SCI associated with the transmission may refer to whether the SCI is used to trigger CSI report. Contents included in the SCI associated with the transmission may refer to whether the SCI is reserving any future resources or not. Contents included in the SCI associated with the transmission may refer the time between the current transmission and a future reserved resource (e.g., whether it is above or below a specific value).

Any parameter related to sensing mechanism and/or sensing results may refer to a specific sensing mechanism used to determine the resources for eventual transmission (e.g., whether using full sensing, partial sensing, random selection, etc.). The sensing mechanism may refer to whether asynchronous sensing is being performed. The sensing mechanism may refer to whether sensing is being performed for pre-emption/re-evaluation or not. The sensing mechanism may refer to a specific sensing result, such as any of the percentage of available resource, the number of selected resources, the timing between the selected resources, whether retransmission resources have been selected or not, whether a sufficient number of resources are available or not (on any given instance of the availability determination), etc. The sensing mechanism may refer to the amount of resources deemed available within a specific time which may represent a COT and/or the required latency of a pending transmission at the WTRU.

Associated with a resource pool may refer to the specific resource pool, or a configuration associated with a resource pool, and may apply when a transmission/reception is made on a resource associated with this pool.

Allocation mode may refer to whether the transmission/reception is mode 1 or mode 2. A WTRU may determine whether it can share a COT (e.g., perform type 2 LBT) based on the mode of the transmission that initiated the COT and/or its own mode of transmission. A WTRU may share a COT if the WTRU trying to share the COT is using the same transmission mode (mode 1 or mode 2) as the WTRU that initiated the COT. A WTRU transmitting using mode 2 may/may not share a COT with a WTRU that initiated the COT using mode 1 and/or mode 2.

Another factor may be the time between a previous transmission and a WTRU's own transmission. A WTRU may perform transmission in slot N assuming it is sharing the COT if it detects another WTRU's transmission (a previous transmission) performed in slot N-1. In addition, the previous transmission in slot N-1 may need to also satisfy another condition herein (e.g., L2 ID/same unicast link, etc.).

Another factor may be the member ID in groupcast. Specifically, a WTRU may assume a first LBT behavior when the member ID has a first value, and may assume a second LBT behavior when the member ID has a second value. For example, a WTRU with member ID=0 may use the DL CAPC table for LBT, and a WTRU with any other member ID may use the UL CAPC table for LBT.

Another factor may be the L2 source/destination ID. Specifically, a WTRU may be configured (e.g., by PC5-RRC, by Uu RRC, by upper layers, etc.) with an LBT behavior to be applied for a give L2 ID or L2 ID pair.

Another factor may be relative to the reservation of resources by the WTRU or other WTRUs. For example, reservation of resources by the WTRU or other WTRUs may refer to whether a transmission is performed on a resource that was previously reserved by the WTRU (for a new TB, or for a retransmission). Specifically, the WTRU may assume a first LBT behavior for transmissions which were not previously reserved, and a second LBT behavior for transmissions which it had previously reserved. The reservation of resources by the WTRU or other WTRUs may refer to whether a transmission is performed on a resource, following, or some amount of time after a resource reserved by another WTRU. For example, a WTRU may use a first LBT behavior (e.g., short LBT) in a slot following a slot reserved by another WTRU and may use a second LBT behavior (e.g., normal LBT) in a slot which does not follow a slot reserved by another WTRU. A similar approach may be used to solve the blocking problem for V2X in unlicensed.

Specifically, if a WTRU fails LBT on slot n-1 for transmission on slot n, and slot n-1 is associated with a slot where sensing results indicate another SL WTRU performed a transmission, the WTRU may perform a short sensing at the beginning of slot n only. Otherwise, the WTRU may perform the normal LBT procedure following LBT failure.

Any of the above factors associated or indicated in a transmission that is decoded/received by a WTRU, where such transmission was either contained within a COT that the WTRU wishes to share, or is associated with the transmission that initiated a COT. Herein, a property of a transmission which initiated a COT, a property of a last detected transmission within a COT, or a property of any given transmission occurring within a COT, may be used interchangeably.

Any combination of specific LBT behavior(s) with specific sidelink factor(s) enumerated above, although not explicitly mentioned in the embodiments below, can be envisioned by a person skilled in the art.

In an embodiment, a WTRU may determine the CAPC based on one or more of the sidelink factors above. Specifically, a WTRU may determine, from the data being transmitted, one or more data associated with that transmission, and may select a CAPC accordingly. A WTRU may further indicate such CAPC in its own transmission, possibly when the WTRU initiates a COT (as opposed to when the WTRU shares an already existing COT).

A WTRU may be configured to select a CAPC based on a combination of cast type and LCH configuration. Specifically, the WTRU may be configured with a CAPC to use for given logical channel priority, and each of unicast, groupcast, or broadcast. For example, if a transmission is associated with unicast, the WTRU may select the CAPC configured to the priority of the LCH for unicast. In such case, the WTRU may be configured with a mapping of both priority and cast type, to CAPC.

A WTRU may determine the CAPC based on the determined MCR of a transmission. For example, a WTRU may be configured with a CAPC to be used for combination of priority and MCR, where MCR may include the range of MCR, or may include whether the transmission is configured with/without MCR.

A WTRU may determine the CAPC based on whether HARQ is enabled or disabled for a transmission. For example, a WTRU may be configured with a first set of CAPC to use (e.g., per LCH or per priority) for HARQ enabled transmissions, and a second set of CAPC to use for HARQ disabled transmissions.

A WTRU may determine the CAPC based on the measured CBR of the sidelink resources. Such CBR may be similar to the legacy SL measured CBR, or may be adapted to the shared spectrum scenario. For example, a WTRU may be configured with a first set of CAPC (e.g., per priority or per LCH) to use for a first range of CBR, and may be configured with a second set of CAPC to use for a second range of CBR, etc.

A WTRU may use a fixed, predefined, or (pre)configured CAPC for specific sidelink transmissions, or whether a SL transmission contains a specific message. For example, DCR messages may use a fixed CAPC. For example, SL MAC CE may use a fixed CAPC. Alternatively, the WTRU may use any CAPC for specific SL transmissions or transmissions containing specific messages (e.g., DCR).

A WTRU may be configured with a specific CAPC to use for transmissions containing SL MAC CE.

A WTRU may be configured with different value of CAPC to use for transmissions containing a SL CSI MAC CE, where each CAPC value may correspond to one or a range of the configured latency bound or remaining time in the latency bound for transmission of a CSI report to the peer WTRU.

A WTRU may use a first CAPC value or set of values for mode 1 transmission, and may use a second CAPC value or set of values for mode 2 transmission.

A WTRU may determine the CAPC to use based on the HARQ feedback resource timing. The WTRU may select from a (pre)configured CAPC which is associated with the time difference between the selected resource and the timing of the PSFCH resource(s) associated with the transmission.

A WTRU may determine the CAPC to use based on the L2 destination ID associated with a transmission. For example, a WTRU may be configured with a CAPC associated with a source/destination L2 ID and may use that CAPC for all (subsequent) transmissions to that source/destination L2 ID. For example, a WTRU may determine the CAPC based on upper layer information (e.g., TX profile, DRX on/off, explicit information) provided by upper layers with the destination L2 ID. For example, a WTRU may maintain/change the CAPC associated with a L2 ID based on SL events (e.g., HARQ, LBT failures, etc.) and may apply the CAPC for that L2 ID until it is changed by the next event.

A WTRU may determine the CAPC to be used based on the QoS flows active/configured for a specific transmission in a L2 ID. Specifically, the WTRU may determine the CAPC for a given L2 ID transmission based on the PQI information associated with one or more QoS flows active for that L2 ID. The WTRU may select the flow with the highest value of a parameter (e.g., priority) and determine the CAPC for the L2 ID based on that parameter.

A WTRU may use different rules, mapping tables, or criteria to determine the CAPC depending on the SL specific factor or characteristic described herein. For example, a WTRU may use a mapping of PQI to CAPC to determine the CAPC for mode 1 transmission, and may use a mapping of L1 priority or LCH priority to CAPC to determine the CAPC for mode 2 transmissions. For example, a WTRU may use a first mapping table when the CBR is above a threshold, and may use a second mapping table when the CBR is below a threshold.

A WTRU may use different rules, mapping tables, and/or criteria (or similar) to determine the CAPC depending on the actual value of the QoS parameter or other being used in the first place to determine the CAPC. For example, a WTRU may use a mapping table from PQI to CAPC to determine the CAPC for a transmission containing data for a certain QoS flow.

However, in the case of a non-standardized PQI value, the WTRU may use a different approach, such as: (1) using a fixed CAPC value; (2) using a table that maps priority to CAPC instead of PQI to CAPC; (3) using the CAPC value associated with the PQI having QoS parameters which are closest to the PQI parameters of the standardized PQI associated with that CAPC; (4) using the CAPC value assigned by the network (e.g. in DCI) for the last transmission associated, possibly associated with the same QoS or similar priority/QoS; and/or (5) using the CAPC value indicated by the peer WTRU in a SL transmission, or configured by the peer WTRU in a PC5-RRC (e.g., as a default CAPC value to be used).

A WTRU may use any factor or rule, specific to SL, for determining the rules associated with COT sharing with a COT initiated by another WTRU and/or the base station (e.g., gNB). Such factors may include any of (but not limited to): (1) the maximum time between the last transmission in a COT and the time in which the said WTRU may transmit in the COT without performing LBT, and/or the type of LBT to be performed for each amount of time or (2) whether the WTRU is allowed to share the COT initiated by another WTRU and/or a base station (e.g., gNB), or whether the WTRU needs to initiate its own COT (i.e., perform full LBT). The allowance may be different for COTs initiated by a WTRU vs COTs initiated by a base station (e.g., gNB). Such factors may also include other LBT properties mentioned herein which describe a factor to share an already initiated COT may also (e.g., such as any factor described above that may determine LBT behavior).

For example, a WTRU may determine the COT sharing rules based on the zone ID transmitted by the other WTRU and the WTRU's own zone ID. The zone ID may represent a distance between the WTRU initiating the COT and the WTRU determining whether to share the COT initiated by the other WTRU. The WTRU may decide that it can share the COT if the distance is smaller than a threshold.

A WTRU may determine the COT sharing rules based on the L2 ID (e.g., destination L2 ID) of the transmission that initiated the COT. For example, a WTRU may share a COT initiated by another WTRU if the L2 destination ID of the transmission that initiated the COT is the same as the L2 destination ID (or in a set of related L2 destination IDs) of the transmission to be made by the WTRU sharing the COT. Furthermore, a WTRU may be configured with a LCP restriction for a grant within a shared COT, whereby such restriction may apply to the allowable (possibly destination) L2 ID(s) that can be selected for such a grant. A WTRU may select only L2 destination ID(s) that are allowed to share the COT initiated by another WTRU for performing transmission in the grant occurring within the COT initiated by another WTRU.

A WTRU may determine the COT sharing rules based on the MCR associated with the transmission that initiated the COT and/or whether the WTRU is within the MCR of that transmission. For example, if the COT was initiated with a transmission containing MCR, and if the WTRU is within the MCR, the WTRU may share the COT for a transmission with the same/related L2 destination ID(s). If the WTRU is outside the MCR, the WTRU may not share the COT for a transmission with the same/related L2 ID(s).

A WTRU may determine the COT sharing rules based on the cast type of the transmission. For example, the WTRU may apply a first maximum gap between transmissions for unicast and a second maximum gap between transmission for groupcast/broadcast, etc.

A WTRU may determine whether or not to share a COT based on the number of resources available (e.g., based on sensing) that can be determined within the duration of the COT. Specifically, if the number of resources available within the duration of a COT and/or within the required latency is above a threshold, the WTRU may decide to share the COT, otherwise, the WTRU may decide to initiate a new COT.

A WTRU may determine whether or not to share a COT, or whether to initiate a new COT based on the remaining duration of the COT and the priority/PDB of the pending transmission. Specifically, the WTRU may be configured with an association between priority/LCH and required remaining duration of a COT. The remaining duration of a COT may further represent the time within the remaining duration in the COT which is within the PDB of the transmission. If the remaining duration is below the required remaining duration for that priority/LCH, the WTRU may not share the COT and may initiate a new COT.

A WTRU may determine its LBT behavior based on the specific network scheduling node (e.g., base station (gNB), cell, etc.).

A first WTRU may transmit a network node ID (e.g., cell ID, base station (gNB) ID, etc.) in its transmission on sidelink, possibly as part of the COT information. The WTRU may include the network node when it is being scheduled in mode 1. Alternatively a WTRU in mode 2 may transmit the network node ID when performing mode 2 transmission while in coverage of and/or RRC_CONNECTED to the specific network node.

A second WTRU may determine its LBT behavior based any or a combination of: the network node received from a first WTRU's transmission; the network node associated with the second WTRU's own scheduling (e.g., if in mode 1, the cell ID scheduling the WTRU, if in mode 2, the cell ID in which the WTRU is RRC_CONNECTED, camped to in RRC_IDLE/RRC_INACTIVE); whether the second WTRU is in coverage or out of coverage, possibly of the same node; the transmission mode (mode 1 or mode 2) of the second WTRU's transmissions; other factors affecting LBT behavior described herein A WTRU in mode 1 may be allowed to share a COT initiated by another WTRU if the other WTRU is also in mode 1 and is being scheduled by the same cell ID. A WTRU in mode 2 may be allowed to share a COT initiated by another WTRU if the cell ID included in the COT information from the another WTRU matches the cell ID of the cell to which the said WTRU is connected/camped. For example, the WTRU may perform LBT using a first set of parameters if the WTRUs own cell ID matches the cell ID received with the COT information, and may perform LBT using a second set of parameters if the WTRUs own cell ID does not match the cell ID received with the COT information.

LBT Behavior may be determined based on a list of related/interested L2 IDs provided to a WTRU.

In one embodiment, LBT behavior (e.g., whether a WTRU can share a COT) may be determined based on the combination of a WTRU's own destination L2 ID, and a list of L2 IDs received by the WTRU, either from another WTRU or from the base station (e.g., gNB). Specifically, a WTRU may determine its LBT behavior based on whether the L2 ID of the transmission associated with LBT matches any L2 IDs contained in the received list. The list of L2 IDs received by the WTRU may represent the interested L2 IDs associated with another WTRU, possibly where such WTRU may have initiated a COT. This is it allows the sidelink system to limit COT sharing to transmission where the WTRU that initiated the COT should be an intended recipient of the transmission that is sharing the COT.

In one embodiment, a first WTRU may transmit its interested L2 IDs (e.g., the L2 IDs of any interested groupcast/broadcast services and/or the source/destination ID pairs of any ongoing unicast link) to one or more other WTRUs. For example, the first WTRU may transmit such information in PC5-RRC signaling, possibly associated with unicast link establishment with a second WTRU. For example, the first WTRU may transmit the updated information upon any change of such information (i.e. a change in interested destination L2 ID signaling by upper layer, the addition/removal of a unicast link to which the WTRU has associated itself, etc.). Alternatively, the first WTRU may transmit the list along with the transmission in the COT itself. For example, the first WTRU may transmit the list in a MAC CE included in its SL transmission.

A second WTRU may receive the list of L2 IDs from the first WTRU and may use the information for determining whether or not to share a COT initiated by the first WTRU. For example, the second WTRU may associate the list of L2 IDs from the first WTRU with the source/destination L2 ID of the unicast link with the first WTRU. The first WTRU, when determining whether or not it can share a COT initiated by the first WTRU, may determine whether the destination L2 ID of the transmission of the second WTRU matches any L2 ID in the list received from the first WTRU. If the source/destination L2 ID of the transmission is one of the source/destination L2 IDs in the received list, the second WTRU can share the COT with the first WTRU, otherwise, the second WTRU may not share the COT with the first WTRU.

In another embodiment, the second WTRU may receive the list/relationship from the base station (e.g., gNB). For example, the second WTRU may receive a list of interested L2 IDs associated with each source/destination L2 ID that representing a peer WTRU in unicast. The second WTRU may determine to apply the list to a first WTRU's transmission based on the source/destination L2 ID provided with the list from the base station (e.g., gNB). In another example, the second WTRU may receive a list of related L2 destination IDs from the base station (e.g., gNB). Such list of related destination L2 IDs may represent the groupcast transmissions which may share a COT. For example, if the L2 destination ID of the first WTRUs transmission, and the destination L2 ID of the second WTRU's transmission occur in the same list, the second WTRU may share the COT with the first WTRU.

Use of the list and how to determine whether to share the COT may depend on the cast type of the transmission from the first WTRU and/or the cast type of the transmission from the second WTRU. For example, the second WTRU may use any or a combination of the following determinations for whether or not to share the COT initiated by the first WTRU. These determination may also apply more generally to an embodiment that does not assume the use of a list as well.

In one determination, if the first WTRU transmission is unicast to the second WTRU, the second WTRU may share the COT as long as the second WTRU is performing unicast transmission to the same unicast link.

In another determination, if the first WTRU transmission is unicast to the second WTRU, the second WTRU may share the COT as long as the second WTRU is performing unicast transmission associated with a pair of source/destination L2 ID which match the destination/source L2 ID in the list received from/for the first WTRU.

In another determination, if the first WTRU transmission is groupcast/broadcast, the second WTRU may share the COT as long as the second WTRU is performing groupcast/broadcast transmission associated with a destination L2 ID which matches a destination L2 ID in the list received from the first WTRU. Alternatively, if the first WTRU transmission is groupcast/broadcast, the second WTRU may share the COT as long as the second WTRU is performing groupcast/broadcast transmission to the same destination L2 ID as the transmission of the first WTRU. Furthermore, the second WTRU may use this latest condition only in the case the second WTRU does not have a list associated with the first WTRU.

The above described embodiment may be generalized to any behavior associated with LBT to access the channel for the second WTRU, as described herein. Specifically, the second WTRU may use the list to determine whether to perform LBT of a first type or a second type. For example, the second WTRU may use the list to determine whether to use a first CW or a second CW.

A WTRU may determine whether to share a COT based on multiple conditions associated with different factors being satisfied, or at least one condition associated with different factors being satisfied. For example, a WTRU may share a COT if the time between the previous transmission and the WTRU's planned transmission is smaller than a threshold, and the L2 destination of the WTRU's transmission matches the L2 ID of the transmission that initiated the COT. A WTRU may share a COT if the L2 destination ID of its transmissions matches the L2 destination ID of the transmission that initiated the COT, or if the WTRU is less than a certain distance from the transmission that initiated the COT.

A WTRU may use a different condition/factor to determine whether to share a COT based on whether another condition/factor is satisfied/tested. For example, if the time between the previous transmission and the WTRU's own transmission is in a first range, the WTRU may share a COT as long as L2 IDs are matching, and if the time between the previous transmission and the WTRU's own transmission is in a second range, the WTRU may share a COT as long as distance between the WTRUs is less than a threshold.

Figure 2:
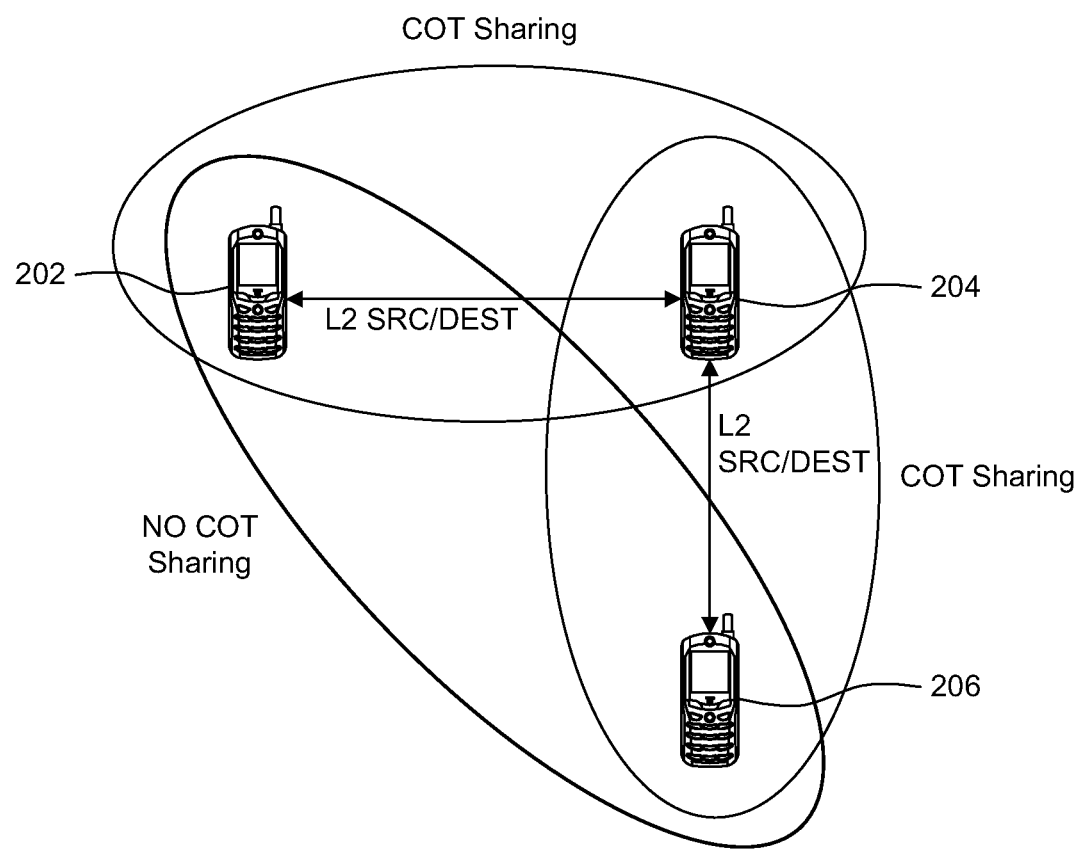
FIG. 2 is a diagram illustrating an example of unicast COT sharing.

FIG. 2 is a diagram illustrating an example of unicast COT sharing. As shown in FIG. 2, a first WTRU 202 may share a COT if the COT is initiated by a second WTRU 204 for a transmission associated with the same unicast link as the transmission of the first WTRU 202. The first WTRU 202 may make this determination based on the L2 source/destination ID included in the SCI which initiated the link. Specifically, if the L2 source ID of the transmission of the first WTRU 202 is the same as the L2 destination ID of the second WTRU 204, and the L2 destination ID of the transmission of the first WTRU 202 is the same as the L2 source ID of the second WTRU 204, the first WTRU 202 may share the COT. Otherwise, the first WTRU 202 may not share the COT.

Alternatively, the first WTRU 202 may share a COT if the COT is initiated by a second WTRU 204 for which the first WTRU 202 has a unicast link with, regardless of the destination of the first WTRU's 202 transmission. Specifically, if a COT is initiated by a transmission with a source/destination L2 ID pair that corresponds to a unicast link that is active at the first WTRU 202, the first WTRU 202 may share the COT for any transmission.

In an alternative, either of the conditions described above may be used to determine whether to share a COT, but the transmission from the second WTRU 204 in question may be a transmission that occurs within the COT, and not necessarily the transmission that initiates the COT. Specifically, as described above, a WTRU may share a COT for transmission associated with a unicast link if the other WTRU associated with the same unicast link performed a transmission within the same COT to be shared.

Whether the WTRU is allowed to perform any of the above alternative (one alternative versus another alternative) may further depend on other SL factors herein (e.g., the priority of the transmission). For example, as shown in FIG. 2, the second WTRU 204 may transmit in a COT initiated by the first WTRU 202 because WTRU 202 and WTRU 204 share a unicast link. However, a third WTRU 206 cannot transmit in a COT initiated by the first WTRU 202 because WTRU 202 and WTRU 206 do not share a unicast link.

A COT may be associated with or identified to be of a specific type, where such type may be determined by one or more sidelink factors. For example, a COT may be a mode 1 COT or a mode 2 COT, depending on whether it was initiated by a mode 1 transmission or a mode 2 transmission. Alternatively, a COT may be mode agnostic (or not specific to any mode). For example, a COT may be a unicast COT, a groupcast COT, or a broadcast COT. Alternatively, a COT may be agnostic of cast type. For example, a COT may be a sensing based COT, a random selection COT, etc. A COT may be a HARQ feedback based COT or a non-HARQ feedback based COT.

A WTRU initiating a COT of a specific type may indicate the COT type within its transmission. Such COT type indication may be carried, for example, in SCI, dedicated PHY channel, MAC CE, CG-UCI, SL RRC message, etc. Alternatively, the COT type may be determined implicitly based on other information included in the sidelink transmission by the WTRU initiating the transmission, or other WTRUs transmitting within the COT.

A WTRU initiating a COT of a specific type may be configured with an LBT behavior (as defined herein) to be used when initiating such COT (e.g., the CW size, the maximum allowable COT length, etc.).

A WTRU may determine its COT sharing rules (as defined herein) based on the COT type and any of the sidelink factors possibly associated with its own transmission to be performed within the COT. A WTRU may be allowed to share a COT of a specific type for unicast transmissions but not for broadcast transmissions. A WTRU may be allowed to share a COT of a specific type for mode 1 transmissions but not for mode 2 transmissions. A WTRU may be allowed to share a COT of a specific type for a HARQ feedback enabled/disabled transmission only. A WTRU may be allowed to share a COT if the COT type matches the type of data being transmitted by the WTRU. A WTRU may be configured with different COT sharing rules, or different LBT parameters depending on whether the transmissions are associated with the COT type or not. A WTRU may be allowed to share a COT of a specific type for a PSFCH transmissions only. A WTRU may be allowed to share a COT of a specific type if the transmission is associated with a specific priority or has a priority larger/smaller than a threshold. The WTRU may be configured with a LCP restriction to allow LCHs to use a grant associated with a COT type or not. A COT may be considered a "universal" COT (i.e., useable by all other WTRUs/transmissions) or a COT of a specific type (usable only by a single WTRU or WTRU-pair or WTRU-base station pair or transmissions of a specific type).

A WTRU may determine whether to initiate a COT of a specific type based on one or a combination of the following: (1) sidelink specific factor mentioned herein and associated with the data to be transmitted (e.g., the cast, HARQ enable, mode, etc.); (2) measured CBR; (3) measured channel occupancy, possibly associated with WiFi (this may be determined based on LBT statistics, RSSI measure, channel occupancy or interference level, etc.); and/or (4) indication, possibly from upper layers, associated with the number of WTRUs in an area, or potentially attempting to share a resource. For example, based on one or a combination of the factors above, a WTRU may decide to initiate a universal COT, or a COT of a specific type.

In one embodiment, a WTRU may determine the COT sharing rules (e.g., whether it may share a COT, the maximum time following a transmission after which it may share the COT and/or apply a specific type of LBT) based on whether the WTRU is able to hear the specific WTRU that initiated the COT and/or the level of indirections to such WTRU that initiate a COT. For example, a WTRU which initiated the COT may be the WTRU which performed type 1 LBT (or full LBT) before performing its transmission.

For example, a TX WTRU that initiates a COT may transmit an indication (e.g., in an SCI) that it is the WTRU which initiated the COT (e.g., value of 0). A TX WTRU that shares a COT may transmit an indication (e.g., in an SCI) associated with the indirection level associated with the WTRU that initiated the COT. Specifically, if the first WTRU shares a COT that was initiated by a second WTRU, the first WTRU may transmit and indication representing a first level of indirection (e.g., value of 1). A WTRU which shares a COT initiated by another WTRU may for example, always increment the indirection level it transmits in the SCI by 1 from the minimum value received in any SCI associated with that COT. And so on. A WTRU that wishes to share a COT initiated by another WTRU may use such indication(s) (in addition to possibly the time since the last transmission and/or other factors herein such as cast type or mode) to determine whether it may share the COT, and/or what type of LBT to perform in order to share the COT.

For example, a WTRU may share a COT initiated by another WTRU if it determines that the other WTRU initiated a COT. A WTRU may share a COT initiated by another WTRU if it determines that the level of indirection received from a transmission (possibly the last transmission, or any transmission) within the COT is less than a threshold. Such threshold may further depend on any sidelink specific factor mentioned herein (e.g., priority).

For example, a WTRU may determine the type of LBT to perform for a sharing a COT with a peer WTRU based on a combination of the indirection level and the time gap between the transmissions. Specifically, for a specific time gap since the last transmission in a COT, the WTRU may use a first LBT type for a first indirection level, a second LBT type for a second indirection level, etc.

Figure 3:
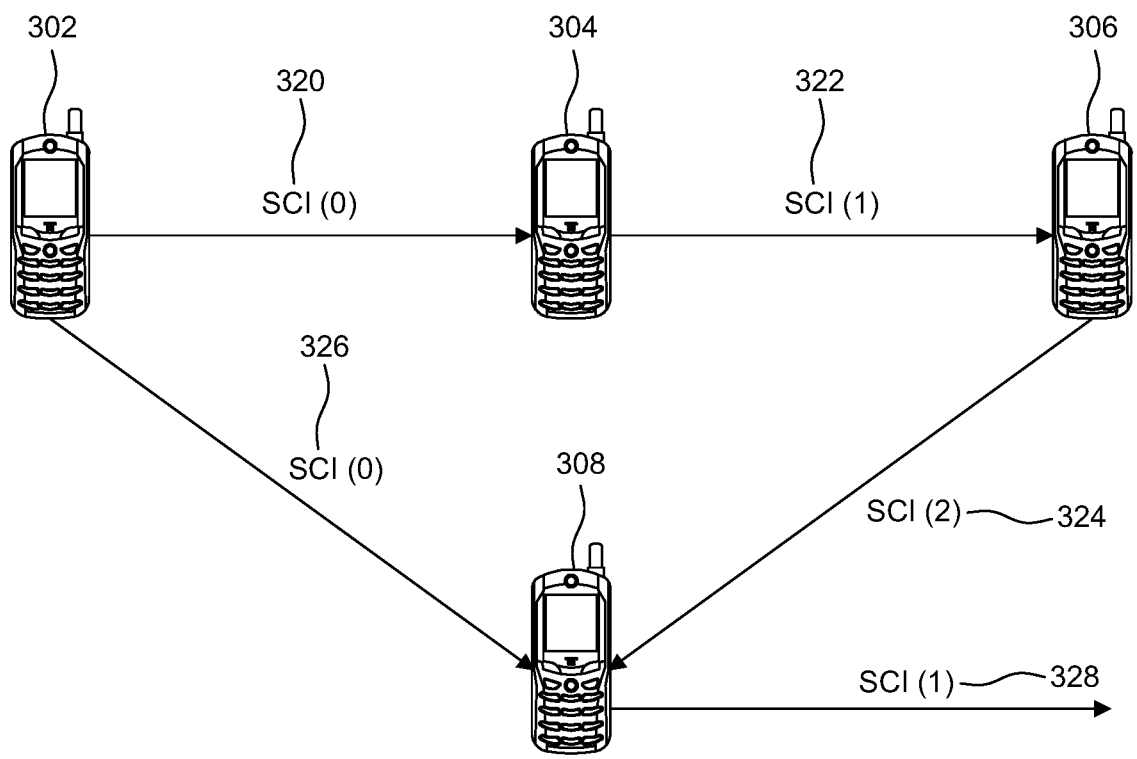
FIG. 3 is a diagram illustrating an example of groupcast/broadcast COT sharing.

FIG. 3 is a diagram illustrating an example of groupcast/broadcast COT sharing. As shown in FIG. 3, WTRU 302 may initiate a COT, using a first set of LBT parameters (i.e., LBT (0)). Because WTRU 302 initiated the COT, it may transmit an indirection value of 0 in SCI transmissions 320 within the COT.

WTRU 304 may receive the COT information from WTRU 302 and decide to share the COT with WTRU 306. WTRU 304 may perform an LBT procedure using a second set of LBT parameters (i.e., LBT (1)) because it represents indirection level of 1. WTRU 304 may also transmits indirection value of 1 in SCI transmission 322.

The behavior of WTRU 306 is similar to that of WTRU 304. WTRU 306 may receive the COT information from WTRU 304 and decide to share the COT with WTRU 308. WTRU 306 may perform an LBT procedure using a third set of LBT parameters (i.e., LBT (2)) because it represents indirection level of 2. WTRU 306 may also transmits indirection value of 2 in SCI transmission 324.

WTRU 308, detects COT information for the same COT from both WTRU 302 and WTRU 306, but with conflicting indirection numbers. WTRU 308 receives an indirection value of 2 from WTRU 306 via SCI transmission 224 and an indirection value of 0 from WTRU 302 via SCI transmission 326. WTRU may decide to follow the minimum indirection number of 0 from WTRU 302, and behave as a WTRU within the first indirection level. Furthermore, WTRU 308 may transmit an indirection value of 1 in any SCI transmissions 328 to additional WTRUs.

A potential issue which may arise with distributed COT sharing is cause by a hidden node problem. Specifically, a first WTRU may initiate a COT and transmit COT information. A second WTRU that does not receive the COT information from the first WTRU (due to hidden node problem), may also initiate its own COT. The second WTRU may initiate the COT well into the COT of the first WTRU. This may result in the sidelink WTRUs occupying the channel for longer than fairness requirements.

In one embodiment, a WTRU may modify its assumed COT structure following reception of a conflicting COT structure from another WTRU. Conflicting COT structure may encompass different assumed LBT behavior associated with the COT (e.g., different CAPC, different required LBT type, etc.). For example, if the CAPC received is lower/higher than the CAPC assumed, the WTRU may consider this as a conflict. Conflicting COT structure may also encompass different COT length. For example, a COT length which is shorter (or a COT indicated by another WTRU that ends earlier than the COT assumed by the said WTRU) may be considered a conflict The WTRU may adopt the COT information received from the other WTRU in the case of a conflict. The WTRU may further modify the COT information it transmits to adhere to the new information, in the case of a conflict. A WTRU may cancel a planned transmission when it receives conflicting COT structure information, possibly if the received COT structure does not allow transmission. A WTRU may inform the network upon reception of a conflicting COT structure.

In another embodiment, a SL WTRU, configured in mode 1, with SL transmissions on unlicensed spectrum, may receive a SL grant from a base station and determine whether the SL grant falls within a COT initiated by another WTRU, based on COT structure information received from SCI transmissions of other WTRUs. If the SL grant falls within the COT initiated by another WTRU, the WTRU may perform a first LBT type to try to share the COT. If the SL grant does not fall within the COT initiated by another WTRU, the WTRU may perform a second LBT type to try to initiate its own COT. If LBT fails for the grant, the WTRU may report a failed LBT to the base station in UCI.

If the LBT succeeds, the WTRU may determine a COT length, report the remaining COT length in the UCI to the base station (e.g., gNB) (depending on which method was used), and report to the base station (e.g., gNB) whether the first WTRU initiated its own COT or is sharing another WTRU's COT. For a WTRU initiated COT, the WTRU may determine the COT length based on the data multiplexed in the SL grant. For a shared COT, the WTRU may determine the COT length from the COT length received in the SCI of another WTRU.

A SL WTRU configured in mode 1 may report success/failure to initiate or share a COT, and the time remaining in the COT (which is determined differently depending on whether the COT is shared or initiated) to the base station. A SL WTRU may determine whether it can share the COT initiated by another WTRU based on combination of priority of transmission and an indirection number received from another WTRU.

In one embodiment, a SL WTRU may determine whether it can share a COT initiated by another WTRU, and the LBT parameters to use to for transmitting in that COT by receiving COT information from one or more other WTRUs that include an indirection number associated with that COT and if the minimum indirection number received by the WTRU associated with that COT is below a threshold configured based on the priority of the data to be transmitted, determine that it can share the COT, and perform LBT using parameters which are determined by the indirection number and priority. If the WTRU acquires the channel, it may transmit an indirection number that is one greater than the received indirection number. Otherwise, the WTRU may determine that it cannot share the COT initiated by the other WTRU, and may initiate its own COT.

In another embodiment, a WTRU operating in mode 2 may perform resource selection based on the presence and/or structure of existing or expected COTs on the SL. A COT may include COTs initiated by other WTRUs (and indicated in SCI by those WTRUs), or COTs initiated by the said WTRU performing resource selection. Herein, an existing COT is a COT that has been initiated by the WTRU or another WTRU through the transmission of an SCI, possibly following a full LBT procedure. An expected COT may include a resource or set of resources which may be expected to be part of a COT as a result of a future transmission by a WTRU that is announced in an SCI. Methods for resource selection herein which depend on the presence of a COT may apply to either existing COTs or expected COTs, with possibly same/different rules.

A WTRU performing mode 2 resource selection may consider the presence and/or structure of existing or expected COTs by selecting resources within a COT or relative to a COT, including restricting or prioritizing resource selection to resources within a COT. In the context of resource selection, prioritizing resources within a COT may include, but not be limited to: (1) selecting a resource within a COT with a higher priority than selecting resources outside a COT; (2) selecting a larger number of resources inside a COT than outside a COT; (3) selecting a resource within a COT more times than selecting a resource outside of a COT; (4) selecting a resource within a COT if the transmission duration on the resource fits within the remaining time in the COT; (5) selecting a resource within a COT if the start time of the transmission resource fits is no larger than a predetermined threshold from the end of the COT; (6) providing the available resources (to the MAC layer) for resource selection such that a larger percentage of the number of available resources reside inside a COT than outside of a COT; and (7) providing the available resources (to the MAC layer) for resource selection such that the amount or ratio of available resources inside a COT is larger (compared to the case when prioritization of resource selection inside the COT is not performed). The selection of resources may include ensuring the start of resources selected are within a COT. The selection of resources may also include ensuring the start of resources occur a maximum time following the initiation of the said COT, thus ensuring that at least the initial transmission resource is within the COT.

A WTRU performing mode 2 resource selection may consider the presence and/or structure of existing or expected COTs by selecting resources associated with of a specific type of COT. A type of COT may be a COT associated with one or more factors described herein (e.g., indirection number satisfies a criteria, cast type is associated with a specific criteria, L2 ID satisfies a criteria, etc.). A type of COT may be a COT for which the selected (if initiated by the WTRU) or indicated (if initiated by another WTRU) CAPC is of a specific value, or is below/above a threshold. A resource may be associated with FBE resource or LBE resource. A type of COT may be a COT initiated by another WTRU (i.e. a shared COT) or a COT initiated by the WTRU itself (e.g., relating to the required LBT type—type 1, 2, or 4—or associated with related LBT configuration parameters—such as congestion period or backoff)

A WTRU performing mode 2 resource selection may consider the presence and/or structure of existing or expected COTs by selecting resources by determining the parameters associated with resource selection depending on the COT presence and/or structure. The determination may include using a first set of parameters when selection is performed within a COT or COT type, and using a second set of parameters when selection is performed outside a COT or in another COT type. The time gap between the last transmission made on the resource and the start of the next SL transmission intended by the WTRU using the same resource. The transmission duration on the SL data resource, and whether it fits within the remaining time in the COT. The determination may include adapting the parameters of resource selection depending on the timing of the resources with respect to the start/end of a COT.

A WTRU may determine parameters associated with resource selection, which may include (but not limited to) any of the following: number of retransmission resources; number of consecutive resources the WTRU should select; pattern of resources, such as minimum/maximum time between transmissions/retransmissions, number of time/frequency contiguous resources to be selected; maximum/minimum number of RBs; time duration of a given transmission/retransmission resource; total number of resources that can be selected, possibly associated with a COT/COT type; whether periodic resource selection, or one-shot resource selection is performed/allowed.

A WTRU may select resources by considering the COT based on one or more conditions. For example, the WTRU may determine whether to select resources by considering the COT if a condition is satisfied (and may not do so otherwise). The WTRU may determine the specific behavior when taking the into account the COT if a condition is satisfied and may use another behavior when considering the COT if the condition is not satisfied. For example, the WTRU may use a first set of parameters when selecting the resources considering the COT when a first condition is satisfied, and may use a different set of parameters otherwise. For example, the WTRU may select resources associated with a first type of COT under the first condition, while selecting resources associated with a second type of COT under a second condition.

The conditions may be related to the type of data (e.g., QoS, LCH, MAC CE vs data, SRB vs. DRB, etc.) available for transmission. The condition may be the presence of data available for transmission having a specific priority. The condition may be whether the data available consists of only MAC CE, or whether the data available includes MAC CE and data or data only. For example, the condition may be whether the data available consists of only SRB bits, or whether the data available includes SRB data. The condition may be the presence of control information available for transmission, possibly having a specific priority. The control information may be SCI multiplexed on a data resource or SCI transmitted on control resources.

The conditions may be related to a configured condition associated with the data. For example, one or more LCHs may be configured to have a specific behavior described herein with respect to resource selection associated with a COT. An LCH may trigger resource selection from LBE/FBE resources. For example, if data is available for a specific LCH that is associated with a configured condition, the WTRU may select resources by considering the COT information/structure. Otherwise, the WTRU may not take COT structure into account during resource selection. For example, the condition may be whether a LCH is configured with HARQ enabled or HARQ disable. The condition may be whether a LCH is configured with MCR and/or a condition on the value of the MCR.

The conditions may be related to the measurements of SL, such as CBR, SL RSRP, SL CSI. For example, the condition may be that the SL CBR, or SL RSRP associated with a unicast link is above/below a threshold The conditions may be related to the cast type of the data available for transmission. For example, the condition may be that the data available for transmission that triggers resource selection is associated with a specific cast type The conditions may be related to the presence of a COT initiated by the WTRU performing resource selection. For example, the condition may be that the WTRU has an active COT that it initiated at the time of resource selection.

The conditions may be related to the presence, ratio, amount of available resources which fall within a COT. For example, the condition may be that the percentage of available resources which fall within a COT is above a threshold The conditions may be related to the number of COTs currently initiated by the WTRU.

The conditions may be related to whether the TB is a retransmission. For example, the WTRU may select a certain resource if the TB is a retransmission (possibly after a number of retransmissions or LBT failures). The retransmission may be due to prior LBT failure, due to receiving/determining NACK, or due to not receiving HARQ feedback for the already transmitted TB. In one example, the WTRU may retransmit the TB using a different resource or resource pool if it received NACK, LBT failed, and/or it hasn't received HARQ feedback. The WTRU may monitor HARQ feedback on a different resource or resource pool if HARQ feedback wasn't received in the expected time following the TB transmission.

The conditions may be related to whether consistent LBT failure is detected on the resources associated with the first type of COT.

The conditions may be related to the number of COTs initiated by the WTRU over a recent period of time. For example, the condition may be that the WTRU has initiated at least N COTs over a (pre)configured past period of time In an embodiment, a WTRU may associate a resource (e.g., a timeslot, set of timeslots, subchannel, set of subchannels, etc.) with one or more property associated with a COT.

In one embodiment, a resource may be considered to be inside a COT or outside a COT, or partially overlapping a COT (i.e. parts of the resource are inside the COT and parts of the resource are outside the COT). For example, the resource may be inside a COT if it ends within the remaining time in the COT. In another embodiment, a resource may be considered to be in a COT of a given indirection number or range thereof, as described herein; or In yet another embodiment, a resource may be considered to be an FBE (frame-based equipment) or LBE (load-based equipment). Specifically, a resource may be tagged as a resource that allows channel access using FBE rules or channel access using LBE rules. The WTRU may determine this access type based on a configuration from higher layers (e.g., RRC or SIB configurations), or based on LCH configurations (e.g., some LCHs may be transmitted on FBE resources).

The WTRU may be (pre)configured or predetermined with a number of times a COT can be (re)-shared with other WTRUs. A configuration from upper layers may configure that a COT can be shared no more than x number of times. The WTRU may include, in the SCI or a COT sharing MAC CE, the number of times this COT has been shared, along with the remaining time in the COT. If the WTRU acquires the COT for the xth time, the WTRU may omit the SCI or the MAC CE associated with COT sharing to other WTRUs. Or, the WTRU may include an indication (e.g., in SCI or a MAC CE) that indicates that this COT cannot be shared anymore. The WTRU may cease using the COT upon the end of the transmission on the xth time it is acquired, or it may occupy the COT until the MCOT is done.

In one embodiment, the WTRU may be configured with a subset of sidelink data resources that can be used with a specific timing. The WTRU may attempt to acquire the channel only at certain timing offsets associated with the resource. The WTRU may be configured to select and perform LBT only on resources starting within a given slot offset from the radio frame boundary, corresponding to the applicable offset. The WTRU may be configured with a subset of possible offsets within the radio frame or within a slot. If the LBT procedure fails, the WTRU may attempt to acquire the channel at the next possible offset.

The WTRU may determine the offset semi-statically from the configuration value or as the time to the next available resource. Alternatively, the WTRU may determine the offset dynamically. A dynamic determination may depend on: (1) the priority of the data associated with the TB; (2) whether data is multiplexed from one or more LCHs that are configured with high priority index; (3) whether data is multiplexed from a subset of configured LCHs or DRBs; (4) the subscription type of the WTRU; or (5) the HARQ process ID selected for the TB. After a failed LBT attempt, the WTRU may increment the offset or use a different resource with a different starting offset.

The WTRU may start a retransmission timer to measure a retransmission time period upon attempting to (re)-transmit a TB that failed LBT. The WTRU may start the retransmission timer only if HARQ-ACK with value NACK is determined for the HARQ process. The WTRU may not attempt to acquire the channel during the retransmission time period. The value of the timer or time period may be configured by upper layers, or dynamically changed based on the previous LBT attempt(s) or the selected timing offset used to acquire the channel.

The WTRU may maintain and be configured with a retransmission timer per resource pool, per SL carrier, per LBT bandwidth/subband, or per MAC entity. In one example, the WTRU may start the timer after LBT failure on a given resource pool. While the timer associated with a certain resource pool is running, the WTRU may not select a resource to retransmit or transmit a TB on that resource pool. the WTRU may (re)-transmit the TB on a different resource pool from the one last selected, possibly if the timer associated with the pool is not running, and/or if the HARQ process ID is configured for the resource pool, and/or the TB size is supported.

A WTRU may prioritize/select resources within a COT or relative to the time location of a COT. A WTRU may determine a set of available resources, where a subset of resources may include resources within a COT, and other resources may not be within a COT. The WTRU may select or prioritized resources within a COT, possibly under certain conditions herein. For example, if data available for transmission is above a threshold priority, the WTRU may select only from the resources within a COT. Otherwise, the WTRU may be allowed to select resources from within a COT, or not within a COT. For example, if the measured CBR is above a threshold, the WTRU may select only from the resources within a COT or may prioritize selection of the resources within a COT.

The WTRU may determine that a plurality of resources are available to select from and perform a transmission or a retransmission.

The WTRU may prioritize the selection of resource, based on the remaining time in COT. The WTRU may prioritize the selection of resources in descending order of remaining COT time. The WTRU may select the resource with the largest remaining time in the COT, based on the remaining time in COT indicated (e.g., in SCI or signaled control information) or determined from the start time of the resource and/or the timing of the previous transmission in the same COT.

The WTRU may also prioritize the selection of resource based on the time needed to perform TB transmission. The WTRU may select the resource only if the remaining time can support transmitting the desired buffered bits, the number of bits per packet, or the number of bits in the TB. The WTRU may select a resource only if the TBs of the grant supports the TB size. Among a plurality of resources that meet the time needed to perform the TB transmission criterion, the WTRU may select the resource with the least duration in time.

The WTRU may also prioritize the selection of resource based on transmission latency. The WTRU may select the resource that meets the transmission latency (which may be determined from the QoS requirement associated with the data to be transmitted, or data that is multiplexed in the TB). For example, the WTRU may select resources that have a COT that ends before the latency budget associated with the data and/or contains data resources that start immediately after a short LBT period.

The WTRU may also prioritize the selection of resource based on RSSI. The WTRU may select a resource that meets a configured or predetermined RSSI or CBR threshold. The WTRU may prioritize the selection of resources by descending order of RSSI.

The WTRU may also prioritize the selection of resource based on the required LBT type or configuration associated with the resource. For example, the WTRU may prioritize the selection of resources that require LBT type 1, type2, then type 4, in that order. The WTRU may prioritize selection of resources with the least CAPC, i.e. requiring a shorter congestion window size for the CCA.

In an embodiment, a WTRU may determine a set of available resources. The WTRU may select or prioritize resources that occur not more than a threshold number of slots from the start or end of a COT. Alternatively, a WTRU may select or prioritize resources that require one or more LBT types to acquire the channel, and not select/deprioritize resources that require one or more different LBT types to acquire the channel. The WTRU may select or prioritize resource that occur not more than a threshold number of slots from the current WTRU or another WTRU's transmission (as detected in SCI), or planned transmission (as determined based on forward looking information in the SCI). The WTRU may select or prioritize resources which are spaced not more than a number of slots from the current WTRUs or another WTRU's transmission based on any condition mentioned herein, for example, if the measured CBR is above a threshold, if the data available for transmission is above a threshold priority, etc.

In an embodiment, a WTRU may determine a set of available resources. The WTRU may select or prioritize transmission of resources within a COT if the WTRU has already initiated a COT, and/or and the resource selection window overlaps with the COT. The WTRU may perform such based on a condition herein, such as the measured CBR is above a threshold and/or the priority of data available for transmission is above a threshold.

In the embodiments above, the rules may apply only to a COT initiated by the WTRU performing resource selection. Alternatively, the rules may apply to COTs initiated by any other WTRU. Alternatively, the rules may apply to a COT initiated by a related WTRU (e.g., a WTRU transmitting to the same L2 destination ID, a WTRU that has a unicast link with the WTRU performing resource selection, a WTRU that is part of the same group as the WTRU performing resource selection, etc.), or a WTRU within a certain number of indirection levels.

In an embodiment, a WTRU may select or prioritize resources associated with a specific COT type. In one example, a WTRU may select or prioritize resources associated with groupcast COT in order to perform resource selection when data available for transmission is associated with groupcast, possibly with the same L2 ID. For example, a WTRU may select resources associated with a COT initiated by any WTRU in a unicast link, possibly when resource selection is initiated when data available for transmission is associated with transmission to that unicast link.

In another example, a WTRU may select or prioritize resources where the number of indirections is below a threshold, possibly under a specific condition described herein. In another example, a WTRU may select or prioritize resources which are FBE under one condition, and may select or prioritize resources which are LBE otherwise (or vice versa). Such condition may be based on the measured CBR. Such condition may be based on the priority of data. Such condition may also be based on a property of the LCH having the highest priority with data available.

In an embodiment, a WTRU may determine the parameters for resource selection based on the COT information, where a parameter may include any parameters discussed herein. COT information may be associated with the resource, such as whether the resource is inside a COT or not, the type of COT the resource is associated with, the time since the initiation of a COT by the WTRU or another WTRU, the time since the last transmission of the WTRU or of another WTRU, etc.

A WTRU may select a first maximum number of RBs when resources are selected within a COT, and may select a second maximum number of RBs when resources are selected outside a COT. A WTRU may select resources for periodic transmission only when such resources are associated with FBE. Otherwise, if resource selection is triggered for one-shot transmission, the WTRU may select resources only from the resources associated with LBE, or may select resources from the resources associated with FBE or LBE.

A WTRU may select resources using a required that have a number of consecutive slots available for transmission when the resources are associated with LBE and may not use such requirement when the resources are associated with FBE. A WTRU may determine the allowable periodicity of resource selection for a multi-shot resource selection based on the configured and/or determined available FBE resources.

A WTRU may determine the allowable number of number of retransmissions for a TB based (e.g., possibly indicated in a single SCI) based on the COT duration.

A WTRU may determine the maximum time between transmissions/retransmissions/selected resources based on the information associated with the COT or COT structure (e.g., CAPC, indirection number, etc.). For example, a WTRU may be configured with an allowable time between retransmissions performed within a COT, where such allowable time is associated with the CAPC for the COT (either indicated as part of the COT initiated by another WTRU, or determined by the WTRU itself when initiating the COT). The WTRU may ensure that the maximum allowable time between retransmissions for the specific CAPC is respected when selecting resources for transmission within the COT.

A WTRU may determine the maximum time between transmissions/retransmissions/selected resources based, when performing resource selection which will initiate a COT at the WTRU, based on the priority/CAPC of data available for transmission at the time of resource selection. Specifically, the WTRU may be configured with a first allowable time for a first priority/CAPC, a second allowable time for a second priority/CAPC, etc.

A WTRU may select consecutive time resources when the WTRU is initiating its own COT. On the other-hand, a WTRU may not be required to select consecutive time resources when the WTRU is transmitting within an already initiated (either by itself, or by another WTRU) COT. The number of consecutive resources (e.g., allowed, required) may further depend on the conditions described herein (e.g., CBR, CAPC, priority of data that triggered resource selection, cast, SL measurements, etc.).

A WTRU may select consecutive time resources when the WTRU is sharing a COT, or transmitting within a COT it has already initiated, based on the time difference between the selected resource and any performed/announced/planned transmission by the WTRU itself or by another WTRU. Specifically, the allowable number of consecutive transmissions may be a function of the time/gap between the resource and the last transmission by a WTRU (possibly within the same COT, or possibly associated with a COT which is not the COT in which the resources are selected).

One advantage of the above embodiments is to allow a WTRU to perform transmission on unlicensed spectrum using resources it that are selected based on the required LBT rules for transmission on unlicensed spectrum. For instance, consecutive resources may be required for initiation of a COT because the WTRU may need to perform CAT4 LBT prior to transmission. Specifically, if LBT fails on the first slot, the WTRU may still transmit in the subsequent slot, as the WTRU has selected the subsequent slot also during resource selection. For sharing a COT, the WTRU may perform short LBT and the number of (possibly consecutive) resources that need to be selected may be smaller.

A WTRU may trigger resource reselection based on conditions associated with COT structure, COT initiation, LBT at the WTRU, in combination with other conditions mentioned herein. Specifically, a WTRU may trigger resource reselection upon any or a combination of the events or conditions described below.

One condition may that the WTRU fails LBT, possibly a number of consecutive times, or possibly for a number of selected (possibly consecutive) resources. Another condition may be that the WTRU fails the initiation of a new COT for the purposes of transmission. Another condition may be that the WTRU fails to share a COT initiated by another WTRU (i.e. the WTRU fails short LBT within an existing COT)

Another condition may be that the WTRU receives an SCI indicating the initiation of a COT by another WTRU, possibly where such COT overlaps with resources that have already been selected by a WTRU, possibly where such COT occurs prior to a resource already selected by the said WTRU, possibly where the said WTRU has a selected resource which requires it to perform its own COT initiation. A WTRU may select resources tailored to the initiation of a COT. Upon reception of an SCI indicating that a COT has been initiated by another WTRU, the WTRU may trigger reselection of these resources to select new resources for transmission in an already initiated COT. A WTRU may have some resources selected for future transmissions. The WTRU may then receive an SCI indicating the initiation of a COT by another WTRU that overlaps with the said resources. If the COT is to be used by a group of WTRUs that does not involve the said WTRU, the said WTRU may perform pre-emption/resource reselection to ensure its future reserved resources do not overlap with the COT.

Another condition may be that the WTRU has data available for transmission, with a CAPC that is higher/lower priority than the any existing/initiated COT. Another condition may be that the data available for transmission is at least of a certain priority. For example, resource reselection may be triggered as a result of the above only if the data priority is above a threshold. Another condition may be that the measured CBR is below a threshold. For example, resource reselection may be triggered as a result of the above only if the CBR is below a threshold.

In an embodiment, a WTRU, when determining whether a resource is available for transmission, may consider both the resource indicated in the forward booking signal (i.e., occurring a booking period after the reservation SCI) as well as other resource(s) which occur before and/or after the forward booked resource, as unavailable for transmission. Such embodiments may be advantageous in that it allows a first TX WTRU to attempt LBT on multiple, possible consecutive, resources (associated to a resource announced in a previous SCI) until LBT is successful (or until a maximum number of resources is reached), while a second TX WTRU may avoid selecting for its own transmission any resource which may be used by the first TX WTRU following a successful LBT.

In one example, a first TX WTRU may initiate LBT on the future announced resource directly indicated by the previous SCI. The first TX WTRU may maintain the planned periodicity for the future announced resource (compared to the first transmission), regardless of the number of failed LBTs prior to the successful first transmission. Alternatively, the first TX WTRU may change the planned gap between the first and second transmission by an amount dependent on the number of failed LBTs for performing the first transmission. Specifically, the first TX WTRU may reduce the planned gap to the second transmission by a number of slots, possibly equal to the number of slots in which LBT failed for the first transmission. As the second TX WTRU (the TX WTRU performing sensing to determine the available resources), the second TX WTRU may assume the resource indicated by the previous SCI, as well as a number of subsequent (possibly consecutive) slots are considered unavailable when performing resource selection.

In another example, a first TX WTRU may initiate LBT on a future (second) resource which is always a value of the period T (i.e., the selected periodicity) from the slot in which it first initiated LBT for the first transmission. In such an example, the first TX WTRU may include, in the SCI, an indication of the number of slots prior to the indicated future (second) resource in which it may initiate LBT for transmission in the future resource. The second TX WTRU may assume the indicated resource, as well as a number of resources prior to the indicated resource (where such number of resources is indicated in the SCI) are considered to be occupied. Additionally, the second TX WTRU may assume a number of time resources or slots after the indicated resource to be occupied, where such number is determined by the total number of possible LBT attempts in consecutive slots, minus the number of slots indicated in the received SCI (i.e., the slots prior to the indicated resource).

A WTRU may trigger preemption/re-evaluation based on triggers associated with COT information (possibly received from another WTRU) and/or LBT status at the WTRU itself. In one example, a WTRU may trigger preemption/re-evaluation if the WTRU fails to acquire the channel (using LBT) prior to a selected and/or indicated resource. The WTRU may perform re-evaluation and select a new resource for transmission as a result.

In another example, a WTRU may trigger preemption/re-evaluation if the WTRU receives an SCI indicating a COT was initiated by another WTRU and the COT overlaps with a selected resource at the said WTRU. The WTRU may further trigger preemption/re-evaluation if the CAPC associated with the COT is different (e.g., higher priority, lower priority) than the CAPC assumed by the said WTRU to select its (overlapping) resource.

In another example, a WTRU may trigger preemption/re-evaluation if the WTRU receives an SCI indicating a COT was initiated by another WTRU, where the COT may occur earlier than the selected resource. Such pre-emption/re-evaluation may further be triggered if the resource selected/reserved by the said WTRU requires initiation of a COT (possibly while the COT initiated by the other WTRU can be shared by the said WTRU). In such a case, the WTRU may reselect resources within the COT indicated in the received SCI only.

The advantage of such embodiments may be to perform reselection at a WTRU when the WTRU determines that a COT was initiated (possibly by another WTRU), and the said WTRU can use that COT for transmission (rather than perform its own COT initiation).

The WTRU may receive (e.g., in mode 1), may select (e.g., in mode 2), or be configured with a multi-occasion sidelink data transmission resource. A multi-occasion resource consists of more than one possibly consecutive data transmission occasion—on which an LBT opportunity is possible-, whereby the WTRU may attempt LBT on each occasion until LBT is successful. Once LBT is successful, the WTRU may transmit on the remaining occasions in the resource without performing LBT again. For each data transmission occasion, the WTRU may attempt to transmit the same TB that failed LBT or transmit a different TB.

In an embodiment, a WTRU sharing a COT may indicate a multi-occasion resource to be shared with one WTRU or more than one WTRU, whereby the sharing WTRU signals to each shared WTRU the starting occasion(s) on which the resource can be started and/or used; such indication may be indicated by SCI or MAC CE. Upon receiving such SCI or MAC CE, the shared WTRUs may perform a short LBT (e.g., type 1 or 2) prior to starting to transmit on the indicated occasion for the shared WTRU or simply transmit without LBT if the gap between the sharing WTRU's transmission and the shared WTRU start time is less than a preconfigured threshold (e.g., the gap for type 1 LBT). The sharing WTRU may indicate possible remaining starting occasions in the COT, and shared WTRU may randomly select among the indicated occasions an occasion to acquire the channel.

The WTRU may receive a multi-occasion resource from the base station (e.g., gNB) by mode-1 type scheduling. The base station may schedule a multi-occasion resource from one or more WTRUs. The base station (e.g., gNB) may indicate to each WTRU the applicable starting occasion. WTRUs may transmit without LBT or using a short LBT prior to the indicate starting occasion.

A mode-2 resource pool may be configured with a number of occasions and a starting time for a multi-occasion resource. the WTRU may determine the HARQ process from the timing of the first occasion within the multi-occasion bundle. The WTRU may keep using the same HARQ process until LBT succeeds. Once LBT succeeds, the WTRU may increment or change the HARQ process (e.g., if the WTRU has further data to transmit).

In one embodiment, a multi-occasion resource may include multiple resource pools, whereby each occasion may be associated with one or more resource pools. The WTRU may be configured with a resource hopping pattern, such that if LBT fails on one occasion, the WTRU attempts the LBT on the next occasion—which may be associated with a different resource pool.

A WTRU that selects a multi-LBT occasion in mode 2, may select multiple resources for its own transmission. A multi-LBT occasion resource may include the same frequency resource(s) in consecutive or non-consecutive slots. Alternatively, a multi-LBT occasion resource may include different frequency resources in the same or different slots.

A WTRU may select multiple resources for its initial transmission, followed by only a single set of resource(s) for its retransmission. Alternatively, the WTRU may select multiple resources for initial transmission, as well as, for each resource of its initial transmission, multiple resources for each retransmission. Whether a WTRU selects a single retransmission resource (set) for each initial transmission resource, or multiple such, may depend on the same conditions described below for whether a WTRU uses multi-LBT occasion selection or not. For example, whether the WTRU selects a single retransmission resource (set) for each initial transmission resource may depend on the time between the transmission and retransmission resource, the LBT type required for the retransmission resource, or whether the selected resources occur within a COT or not.

In another embodiment, a WTRU may perform the initial transmission or the retransmission in any of the multi-LBT occasion resources. Specifically, upon successful LBT on a multi-LBT occasion SL resource, the WTRU may perform initial transmission followed by retransmission in the remaining resources of the multi-LBT transmission resources. The WTRU may further assume that LBT is not required (or a different LBT type is required) for transmission on the remaining resources after successful LBT.

A mode 2 WTRU may perform selection of multi-LBT occasion SL resources based on certain conditions. Specifically, a mode 2 WTRU may decide to perform selection of multi-LBT occasion and/or the number of retransmission resource(s) for each initial transmission resource based on any or a combination of the following are satisfied:

A mode 2 WTRU may decide to perform selection of multi-LBT occasion and/or the number of retransmission resource(s) for each initial transmission resource based on Resource selection is performed on a resource pool associated with unlicensed operation. For example, a WTRU may select multi-LBT occasion SL resources if the selection is performed on a pool of resources associated with SL unlicensed, and may not perform such selection when the pool of resources is on non-shared spectrum (non-unlicensed spectrum)

A mode 2 WTRU may decide to perform selection of multi-LBT occasion and/or the number of retransmission resource(s) for each initial transmission resource based on whether the selected resources occur in a COT. For example, a WTRU may select multi-LBT occasion SL resources if the selected resource (e.g., the first selected resource) occurs outside of a COT, otherwise, the WTRU may not select multi-LBT occasion SL resources (i.e. if the selected resource occurs in a COT). For example, if the selected retransmission resources occur within the COT initiated by any of the initial transmission resources, the WTRU may select a single (set of) retransmission resources for the initial transmission resource. Otherwise, the WTRU may select multiple (e.g., multi-LBRT occasion) SL resources for each retransmission.

A mode 2 WTRU may decide to perform selection of multi-LBT occasion and/or the number of retransmission resource(s) for each initial transmission resource based on the type of LBT required for performing transmission. For example, the WTRU may perform selection of multi-LBT occasion SL resource if the transmission requires a specific LBT type (e.g., type 1 LBT, type 2 LBT) otherwise, it may perform legacy resource selection A mode 2 WTRU may decide to perform selection of multi-LBT occasion and/or the number of retransmission resource(s) for each initial transmission resource based on the priority of the data to be transmitted. For example, the WTRU may perform selection of multi-LBT occasion SL resource if the priority of data available for transmission is above a threshold, otherwise, it may perform legacy resource selection A mode 2 WTRU may decide to perform selection of multi-LBT occasion and/or the number of retransmission resource(s) for each initial transmission resource based on the time between the transmission and retransmission. For example, if the time between the selected transmission and retransmission is below a threshold, the WTRU may select only a single (set of) retransmission resource for all of the initial transmission resources associated with the multi-LBT occasion.

A mode 2 WTRU may decide to perform selection of multi-LBT occasion and/or the number of retransmission resource(s) for each initial transmission resource based on the measured CBR, or any congestion metric of the SL. For example, the WTRU may perform selection of multi-LBT occasion SL resource if the measured CBR is below a threshold, otherwise, it may perform legacy resource selection.

A WTRU may further be configured with rules and/or parameters to determine the number and/or pattern of resources in a multi-LBT occasion. A WTRU may be configured with a maximum number of resources (i.e., single slot resources) that may be selected for a multi-LBT occasion. A WTRU may also be configured with a minimum/maximum number of slots between each/any single slot resource of a multi-LBT occasion. A WTRU may also be configured with a maximum time from the start/end of the resource selection window, or the instant of resource selection, in which the start of a multi-LBT occasion can occur. A WTRU may also be configured with a minimum/maximum number of frequency resources that can be part of the multi-LBT occasion. A WTRU may determine any of the above rules and/or parameters based on a combination of the following:

A WTRU may determine the number and/or pattern of resources in a multi-LBT occasion based on sensing results. For example, a WTRU may select a number of resources (e.g., up to a maximum) based on other factors herein. However, if the sensing results indicate that such number of resources are not available based on sensing results, the WTRU may select a lower number of resources. Specifically, the WTRU may select up to a maximum number of resources if allowed based on the availability information provided by sensing results.

A WTRU may determine the number and/or pattern of resources in a multi-LBT occasion based on priority/QoS. For example, a WTRU may select a number of resources which depends on the priority/QoS of the data available for transmission.

A WTRU may determine the number and/or pattern of resources in a multi-LBT occasion based on COT information. For example, a WTRU may determine the allowable time between resources of a multi-LBT resource based on whether the resources are inside a COT (e.g., initiated by another WTRU) and/or the COT information (e.g., CAPC).

A WTRU may determine the number and/or pattern of resources in a multi-LBT occasion based on CBR. For example, a WTRU may be configured with a maximum number of resources associated with a multi-LBT occasion for a given measured CBR.

A WTRU may fail LBT on one or more single resource(s) of the multi-LBT occasion resource. In such a case, the WTRU may initiate or continue LBT on the next resource of the multi-LBT occasion resource. A remote WTRU may perform LBT on each subsequent resource of the multi-LBT occasion resource until LBT succeeds, or until the WTRU has exhausted LBT attempts on each of the resources in the multi-LBT occasion resource.

A WTRU, upon successful LBT on one of the resources of a multi-LBT occasion resource, may perform any or a combination of the following:

A WTRU, upon successful LBT on one of the resources of a multi-LBT occasion resource, may perform transmission on the resource associated with successful LBT. Specifically, the WTRU may perform initial transmission on the resource following successful LBT. The WTRU may further determine whether it can perform initial transmission on the resource following successful LBT, or whether it should select a subsequent resource (not necessarily the resource immediately following successful LBT) based on conditions described herein. Specifically, the WTRU may determine whether to perform transmission in the first resource following successful LBT if the priority of the pending data transmission is above a threshold, if the CBR is below a threshold, if the sensing results indicates that the resource is available, or any combination thereof, or with other factors described herein.

A WTRU, upon successful LBT on one of the resources of a multi-LBT occasion resource, may perform transmission on a subsequent resource associated with a successful LBT. Specifically, the WTRU may choose one of the remaining resources associated with the multi-LBT occasion resource on which to start transmission, and may initiate transmission on the selected resource. The WTRU may select the resource based on:

A WTRU may select the resource based on priority. For example, the WTRU may be (pre)configured with a mapping between priority/QoS and resource following successful LBT on which to initiate transmission. Specifically, a WTRU with higher priority transmission may initiate transmission immediately (or earlier) in the remaining resources of the multi-LBT resource, while a WTRU with lower priority transmission may initiate transmission later following successful LBT.

A WTRU may select the resource based on the remaining PDB. The WTRU may determine which resource in the remaining resources following successful LBT to initiate transmission on based on the remaining PDB. For example, the smaller the remaining PBD, the earlier the WTRU may initiate the transmission. The WTRU may (randomly or based on other rules herein) select a resource for initiation of transmission following successful LBT which ensures the transmission and possibly subsequent retransmissions are performed before the PBD expires.

A WTRU may select the resource based on random or probabilistic rules. For example, the WTRU may randomly select from one of the remaining resources of the multi-LBT occasion, which may further meet any of the other criteria, on which to initiate transmission. The WTRU may be configured with a probability (which may depend on or be determined by the other factors herein) with which to initiate transmission on any of the remaining resources of the multi-LBT occasion.

A WTRU may select the resource based on a HARQ timeline. For example, the WTRU may select the resource in the remaining resources following successful LBT on which to initiate transmission that respect the HARQ timeline selected by the WTRU during selection of the resource for transmission and retransmission.

A WTRU may select the resource based on sensing results. For example, the WTRU may determine whether to transmit in one of the resources of the multi-LBT occasion resource based on whether the WTRU detects other SL WTRU transmissions (i.e., in SCI). The WTRU may initiate a continuous partial sensing operation upon initiation of LBT, or upon successful LBT. The WTRU may initiate transmission only in the first resource of the multi-LBT resource in which the continuous partial sensing indicates the resource is available.

A WTRU may perform transmission on multiple resources of the multi-LBT resource following successful LBT. For example, the WTRU may decide to perform transmission on multiple (possibly time contiguous) resources of the multi-LBT resource starting from successful LBT. The WTRU may determine whether to perform multiple transmissions, and the number of subsequent retransmissions based on any or a combination of the following:

A WTRU may determine whether to perform multiple transmissions, and the number of subsequent retransmissions based on priority/QoS of the transmission. For example, the WTRU may be allowed to use multiple of the remaining resources after successful LBT for transmissions and retransmissions if the priority of the TB is above a threshold.

A WTRU may determine whether to perform multiple transmissions, and the number of subsequent retransmissions based on priority/QoS of subsequent data. For example, the WTRU may be allowed to use subsequent resources, following the first transmission after successful LBT, if the WTRU has additional data for transmission with priority above a threshold, or some priority relative to the first transmission (e.g., at least the same priority as the first transmission, not more than a certain priority lower than the first transmission).

A WTRU may determine whether to perform multiple transmissions, and the number of subsequent retransmissions based on CBR. For example, the WTRU may be allowed to use subsequent resources of the multi-LBT resource as long as the CBR is below a threshold. The number of subsequent resources of the multi-LBT resource which can be used may depend on the measured CBR.

A WTRU may determine whether to perform multiple transmissions, and the number of subsequent retransmissions based on the number of planned/allowed retransmissions: For example, a WTRU may use the subsequent resource(s) if it has planned retransmissions, possibly associated with the TB which was transmitted initially in the multi-LBT resource following successful LBT.

A WTRU may indicate (e.g., in SCI) that it may maintain the resource, or perform transmission on the next resource(s). The WTRU may further indicate whether it decides to use the next resource(s) for initial transmission or retransmission, and/or the priority of such (re)transmissions.

A WTRU may continue performing LBT, or perform a shorter LBT. For example, following successful LBT on a multi-LBT occasion, if the WTRU decides to perform transmission a number of slots after the successful LBT (as determined based on conditions herein), the WTRU may continue to perform LBT, or may perform a short LBT prior to the resource selected for actual transmission following the first successful LBT for the multi-LBT occasion. For example, the type of LBT may further depend on the time between the first successful LBT, and the selected resource of the transmission within the multi-LBT occasion. Specifically, if the WTRU decides to transmit immediately following the first successful LBT, or a maximum of N slots following the first successful LBT, the WTRU may transmit without a short LBT.

A WTRU may be configured to perform a recovery procedure upon failure associated with acquiring the resources selected in a multi-LBT occasion. A WTRU may be configured to perform a recovery procedure upon any failure related to LBT in general (e.g., after one or a number of failed SL LBTs). Such recovery procedure may be any of the following:

The recovery procedure may be performing resource and/or carrier reselection. The recovery procedure may also be performing an UL transmission, possibly informing the base station (e.g., gNB) of the failure. The recovery procedure may also be declaring SL RLF. The recovery procedure may also be initiating transmission on an FBE resource. The recovery procedure may also be initiating an RRC connection.

The trigger for performing the recovery procedure may be associated with properties of the multi-LBT resource. A WTRU may trigger a recovery procedure upon the failure of resource selection (possibly a number of consecutive times, or a number of times within a time window) to select an appropriate set of available resources for a multi-LBT occasion. An appropriate number of available resource may include finding at least N consecutive single slot resources within the resource selection window.

A WTRU may trigger a recovery procedure upon LBT failure on all of the resources associated with the multi-LBT occasion, possibly a consecutive number of times, or a number of times within a window.

A WTRU may trigger a recovery procedure upon one or multiple events (e.g., a consecutive number of events, or a number of events occurring within a configured window of time), associated with failure to acquire the channel during a multi-LBT occasion, or successfully acquiring the channel during a multi-LBT occasion but having: (1) the number of resources remaining within the occasion below a threshold; (2) not performing a transmission, or a number of retransmissions due to sensing results indicating the unavailability of the resources; and/or (3) performing a number of transmissions and/or retransmissions within the multi-LBT occasions that is below a configured or desired amount associated with a successful event.

A WTRU may perform data multiplexing for transmission on a SL using rules/restrictions (e.g., LCP restrictions) specific to COT information, which may be associated with a grant. Such restrictions may be associated to any property herein which is tied to a COT or to COT-related information. A WTRU may determine information about a COT from an explicit transmission from another WTRU (i.e., an information element provided by the peer WTRU about the COT). The WTRU may, alternatively or additionally, determine information about a COT from the transmission itself (e.g., the cast type, the L2 ID, the MCR, or any other information included in a sidelink transmission, etc.). For example, a WTRU may identify the presence of a COT, and may associate a cast type, L2 ID, MCR, etc. with the COT by determining any of these parameters associated with one (e.g., the first) or any transmission that occurs in the COT.

Specifically, an LCP restriction may be performed by a WTRU during the selection of a L2 destination ID and/or selection of a logical channel for transmission on sidelink. That LCP restriction may be related to any of the following properties associated with a grant:

The LCP restriction may be related to whether the grant is within an existing COT or not (i.e., whether it is associated with creation of a COT by the WTRU)

The LCP restriction may be related to whether the grant is within a COT, whether the COT was initiated by the WTRU itself, or by another WTRU.

The LCP restriction may be related to whether the grant is within a COT, whether the COT was initiated by unicast/groupcast/broadcast transmission.

The LCP restriction may be related to whether the grant is within a COT, the source/destination L2 ID of the WTRU whose transmission initiated the COT.

The LCP restriction may be related to whether the grant is a mode 1 grant or a mode 2 grant.

The LCP restriction may be related to whether the grant is within a COT, the COT length, remaining COT length, or any time relationship between the COT and the grant itself.

The LCP restriction may be related to whether the grant is within a COT, the number of SL transmissions which were already performed within the COT, the occupancy of the channel (CR, CBR, or number of subchannels reserved/used) measured within the COT, based on transmissions of other WTRUs, or of the WTRU itself.

An LCP restriction may be associated with the CAPC of the COT within which the grant resides. For example, a WTRU may be allowed to multiplex data of a certain LCH as long as the CAPC of that data is higher priority than the CAPC associated with the COT which the WTRU is trying to share.

For example, a WTRU may receive a CAPC within a COT initiated by another WTRU. The WTRU may restrict selection of LCHs which may be multiplexed into the grant to LCHs which have a priority related to the CAPC, for example: list of allowed priorities associated with the CAPC; priority above a threshold which is determined based on the CAPC; and/or priority has some relation (e.g., larger than or equal to, not smaller than a certain number of levels lower than) to the priority of the CAPC.

An LCP restriction may be associated with a grant in a COT initiated by the WTRU, or shared with another WTRU. For example, a WTRU may be allowed/not allowed to multiplex data of a certain priority or priority range into a grant used to initiate a COT; a grant in which the WTRU shares a COT; and a grant in which the WTRU transmits on a COT it already initiated. Further, combinations of each of the three cases are possible. For example, a WTRU may be allowed to multiplex data with a priority higher/lower than a threshold in a grant in which the WTRU will initiate and/or initiated its own COT.

For example, a WTRU may be configured with a first priority restriction rule for grants within a COT initiated by another WTRU, and a second priority restriction rule for a COT initiated by that WTRU itself. For example, if the grant falls within a COT initiated by another WTRU, the transmitting WTRU may only select LCHs with priority that are at least as high as the priority/CAPC indicated in the COT information. If the grant falls within a COT to be initiated by the WTRU itself, the WTRU may select any LCH priority to multiplex into the COT.

In another example, a WTRU may be configured with a first priority restriction rule for grants within a COT that result in the initiation of a COT versus grants which are within a COT that was already initiated by that WTRU. For example, if the grant falls in the COT that was previously initiated by the WTRU itself, the WTRU may/may not restrict the LCHs, or may use a different priority restriction that the restriction associated with the grant that it used to initiate the COT.

An LCP restriction may be associated with a property tied to the COT and/or associated with the data transmitted in the grant which initiated the COT, where such property may be the cast type, destination ID, priority, WTRU group, delay, PDB, or any other SL property described herein. For example, a WTRU may be allowed to multiplex data of a specific cast type in a grant occurring within a COT, where such case type is determined by the cast type associated to the COT (e.g., included in the information in the COT) or the cast type that was used in the grant which initiated the COT. Specifically, once a COT is used for a specific cast type, the COT needs to continue to be used for that cast type. Furthermore, the restriction may depend on the cast type itself. For example, a WTRU which is sharing a COT that was initiated by a unicast transmission may only select a L2 destination ID that is the same as the L2 source ID of the WTRU which initiated the COT. For example, a WTRU which is sharing a COT that was initiated by a broadcast transmission may select a L2 ID associated with either groupcast (possibly of the same L2 ID that initiated the COT) or any unicast transmission. For example, a WTRU which is sharing a COT that is initiated by a broadcast transmission may select any L2 ID for a transmission which will share the COT.

For example, a WTRU may be allowed to multiplex data of a specific L2 ID in a grant occurring within a COT, where such L2 ID is determined by the cast type associated to the COT (e.g., included in the information in the COT) or the L2 ID that was used in the grant which initiated the COT. Specifically, once a COT is used for a specific L2 ID, the COT needs to continue to be used for that L2 ID. Specifically, a WTRU with a pending grant which occurs within a COT initiated by a groupcast/broadcast transmission may select the L2 ID for transmission on that grant that is the same as the L2 ID of the transmission that initiated the COT.

An LCP restriction may be associated with indirection number, as described herein, associated with a COT. For example, a WTRU may be configured with a set of LCHs that can/cannot be multiplexed into a grant occurring within a COT of a certain indirection number or set of indirection numbers. For example, a WTRU may be configured with one or more cast type that can/cannot be multiplexed into a grant occurring within a COT of a certain indirection number or set of indirection numbers An LCP restriction may be associated with the mode of transmission (i.e., mode 1 vs mode 2). For example, a COT may be associated with a mode (i.e., mode 1 or mode 2), which may represent the resource selection mode that was used by a WTRU when initiating a COT. A WTRU may determine the mode of transmission that was used to initiate a COT from information in the transmission itself. A WTRU initiating a COT may include the mode of operation (mode 1 or mode 2) used to initiate a COT. A WTRU may be configured with a set of LCHs that can/cannot be multiplexed in a COT associated with mode 1 and/or mode 2.

An LCP restriction may be associated with the MCR of the data available for transmission and/or the transmission that initiated the COT. For example, a WTRU may decide the allowable L2 destination ID, LCH priority, or other restriction on the logical channels to be multiplexed in the grant based on whether the COT was initiated by a transmission with/without MCR. For example, a WTRU that shares a COT initiated by a transmission with MCR may only select L2 ID matching the L2 ID of the transmission which initiated the COT. Otherwise, if the COT was initiated with a transmission without MCR, the WTRU may select any L2 ID In another example, a WTRU may decide the allowable L2 destination ID, LCH priority, or other restriction on the logical channels to be multiplexed in the grant based on whether the WTRU using the grant is located inside/outside the MCR of the transmission that initiated the COT. For example, if the WTRU is located inside the MCR associated with the transmission that initiated the COT, the WTRU may select any L2 ID and/or LCH priority for the grant which is sharing the COT. Otherwise, if the WTRU is located outside of the MCR associated with the transmission that initiated the COT, the WTRU may be restricted to selection of the same L2 ID and/or limitation of the LCH priorities that can be multiplexed into the grant (e.g., only LCH with priority higher than or equal to the CAPC associated with the COT)

In another example, a WTRU may decide the allowable L2 destination ID, LCH priority, or other restriction on the logical channels to be multiplexed in the grant based on whether the MCR of the transmission that initiated the COT is above/below a threshold. For example, a WTRU may be configured or may determine (e.g., based on other factors described herein) a threshold MCR. If the MCR for the PDU is above the threshold, the WTRU may be allowed to include logical channels with any priority. If the MCR is below the threshold, the WTRU may only include logical channels with priority equal to the CAPC, or the priority determining the CAPC.

Further, the WTRU may decide the allowable L2 destination ID, LCH priority, or other restriction on the logical channels to be multiplexed in the grant based on any of the three combinations described above.

An LCP restriction may be based on the occupancy of the SL resources within the COT. For example, a WTRU may decide the allowable destination L2 ID, LCH priority, or other restriction based on the measured occupancy of the SL resources within the COT. For example, if the occupancy of the channel, possibly within the COT, is determined as low (e.g., below a threshold), the WTRU may include LCHs with lower priority (e.g., below a threshold, below the CAPC of the COT, etc.) when sharing the COT. Alternatively, if the occupancy of the channel, possibly within the COT, is determined as high (e.g., above a threshold), the WTRU may be restricted to only LCHs with high priority (e.g., above a threshold, below the CAPC of the COT, etc.).

An LCP restriction associated with the node that initiated a COT. For example, a WTRU may be configured with a set of LCHs that can/cannot be multiplexed into a grant occurring in a COT initiated by the base station (e.g., gNB) or by a another WTRU. For example, the WTRU may use a first LCP restriction rule for a COT initiated by another WTRU, and may use a second LCP restriction rule for a COT initiated by the base station (e.g., gNB).

A WTRU may decide to apply an LCP restriction to include data related to only comparable priorities, comparable data/control types, or similar. Such an embodiment may be used to avoid the case where a WTRU selects a low priority CAPC (due to low priority data being included in the PDU) when the PDU contains high priority data. In one example, the WTRU may restrict the difference between the minimum and maximum priority to be less than a threshold. In one example, if the WTRU includes data or control with a priority that is larger than a threshold, the WTRU cannot include any data or control with a priority that is smaller than a threshold. In one example, the WTRU may be (pre) configured with a set of combinations of priority that can be included in the PDU together. In one example, the WTRU may apply an LCP restriction when the PDU includes MAC CE or DRB. In such embodiments herein, priority can refer to LCH priority, L1 priority, or directly CAPC.

A WTRU may decide whether to apply an LCP restriction (e.g. any of the LCP restrictions above) or not based on SL factors or the type of transmission, as identified herein. For example, a WTRU may apply an LCP restriction on a first resource allocation mode (e.g. mode 1) and not apply an LCP restriction on a second resource allocation mode (e.g. mode 2).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method performed by a first wireless transmit/receiver unit (WTRU), the method comprising:
   receiving, from a second WTRU that initiates a shared channel occupancy time (COT) with the first WTRU, a sidelink control information (SCI), the SCI including:
   (1) COT information, wherein the COT information includes an associated channel access priority class (CAPC) value; and
   (2) at least one of: (a) a source ID associated with the second WTRU or (b) a destination ID associated with the second WTRU;
   using the shared COT; and
   performing a type 2 LBT procedure for a transmission during the shared COT;
   wherein if the shared COT is associated with a unicast type, the source ID of the transmission from the first WTRU matches the received destination ID associated with the second WTRU, and the destination ID of the transmission from the first WTRU matches the received source ID associated with the second WTRU,
   wherein if the shared COT is associated with a multicast type, the destination ID of the transmission from the first WTRU matches the received destination ID associated with the second WTRU, and
   wherein the CAPC value associated with the COT information and the CAPC value associated with the data for transmission have an integer value between 1-4.

2. The method of claim 1, wherein the first WTRU is a responding WTRU.

3. The method of claim 1, wherein the second WTRU is an initiating WTRU.

4. The method of claim 1, wherein the type 2 LBT procedure is performed on a channel associated with the COT based on a determination that that COT can be shared.

5. The method of claim 1, wherein, on a condition that the type 2 LBT procedure is successful, transmitting data.

6. The method of claim 1, wherein a lower value of the CAPC value associated with the COT information and the CAPC value associated with data for transmission indicates a higher priority.

7. The method of claim 1, wherein the SCI further includes a duration of the COT.

8. A first wireless transmit/receiver unit (WTRU) comprising:
   a transceiver; and
   a processor;
   wherein the transceiver and processor are configured to:
   receive, from a second WTRU that initiates a shared channel occupancy time (COT) with the first WTRU, a sidelink control information (SCI), the SCI including:
   (1) COT information, wherein the COT information includes an associated channel access priority class (CAPC) value; and
   (2) at least one of: (a) a source ID associated with the second WTRU or (b) a destination ID associated with the second WTRU;
   the shared COT; and
   perform a type 2 LBT procedure for a transmission during the shared COT;
   wherein if the shared COT is associated with a unicast type, the processor is further configured to match the source ID of the transmission from the first WTRU to the received destination ID associated with the second WTRU, and the destination ID of the transmission from the first WTRU to the received source ID associated with the second WTRU; and
   wherein if the shared COT is associated with a multicast type, the processor is further configured to match the destination ID of the transmission from the first WTRU to the received destination ID associated with the second WTRU; and
   wherein the CAPC value associated with the COT information and the CAPC value associated with the data for transmission have an integer value between 1-4.

9. The first WTRU of claim 8, wherein the first WTRU is a responding WTRU.

10. The first WTRU of claim 8, wherein the second WTRU is an initiating WTRU.

11. The first WTRU of claim 8, wherein the type 2 LBT procedure is performed on a channel associated with the COT based on a determination that that COT can be shared.

12. The first WTRU of claim 8, wherein the transceiver is further configured to, on a condition that the type 2 LBT procedure is successful, transmit data.

13. The first WTRU of claim 8, wherein a lower value of the CAPC value associated with the COT information and the CAPC value associated with data for transmission indicates a higher priority.

14. The first WTRU of claim 8, wherein the SCI further includes a duration of the COT.

* * * * *

UNITED STATES PATENT AND TRADEMARK OFFICE
CERTIFICATE OF CORRECTION

PATENT NO. : 12,160,892 B2
APPLICATION NO. : 18/640110
DATED : December 3, 2024
INVENTOR(S) : Martino M. Freda et al.

Page 1 of 1

It is certified that error appears in the above-identified patent and that said Letters Patent is hereby corrected as shown below:

In the Claims

In Column 58, Line 45, In Claim 10, insert the word --use-- before "the shared COT; and"

Signed and Sealed this
Fourth Day of February, 2025

Coke Morgan Stewart
*Acting Director of the United States Patent and Trademark Office*